(12) United States Patent
Xu et al.

(10) Patent No.: US 7,969,638 B2
(45) Date of Patent: Jun. 28, 2011

(54) DEVICE HAVING THIN BLACK MASK AND METHOD OF FABRICATING THE SAME

(75) Inventors: Gang Xu, Cupertino, CA (US); Chun-Ming Wang, Fremont, CA (US); Fan Zhong, Fremont, CA (US); Qi Luo, Cupertino, CA (US)

(73) Assignee: QUALCOMM MEMS Technologies, Inc., San Diego, CA (US)

( * ) Notice: Subject to any disclaimer, the term of this patent is extended or adjusted under 35 U.S.C. 154(b) by 122 days.

(21) Appl. No.: 12/101,073

(22) Filed: Apr. 10, 2008

(65) Prior Publication Data

US 2009/0257105 A1    Oct. 15, 2009

(51) Int. Cl.
*G02F 1/03* (2006.01)
*G02B 27/00* (2006.01)

(52) U.S. Cl. ........................ 359/242; 359/577
(58) Field of Classification Search .......... 359/577, 359/578, 580, 584, 586, 588, 589, 590, 242
See application file for complete search history.

(56) References Cited

U.S. PATENT DOCUMENTS

| | | |
|---|---|---|
| 3,247,392 A | 4/1966 | Thelen |
| 3,701,586 A | 10/1972 | Goetz |
| 3,728,030 A | 4/1973 | Hawes |
| 3,886,310 A | 5/1975 | Guldberg |
| 3,955,190 A | 5/1976 | Teraishi |
| 4,087,810 A | 5/1978 | Hung et al. |
| 4,403,248 A | 9/1983 | te Velde |
| 4,421,381 A | 12/1983 | Ueda et al. |
| 4,441,789 A | 4/1984 | Pohlack |
| 4,441,791 A | 4/1984 | Hornbeck |
| 4,498,953 A | 2/1985 | Cook et al. |
| 4,560,435 A | 12/1985 | Brown et al. |
| 4,655,554 A | 4/1987 | Armitage |
| 4,786,128 A | 11/1988 | Birnbach |
| 4,859,060 A | 8/1989 | Katagiri et al. |
| 4,925,259 A | 5/1990 | Emmett |
| 4,954,789 A | 9/1990 | Sampsell |
| 4,956,619 A | 9/1990 | Hornbeck |
| 4,973,131 A | 11/1990 | Carnes |
| 4,982,184 A | 1/1991 | Kirkwood |
| 5,022,745 A | 6/1991 | Zahowski et al. |
| 5,028,939 A | 7/1991 | Hornbeck et al. |
| 5,034,351 A | 7/1991 | Sun et al. |

(Continued)

FOREIGN PATENT DOCUMENTS

EP    0 668 490    8/1995

(Continued)

OTHER PUBLICATIONS

Longhurst, 1963, Chapter IX: Multiple Beam Interferometry, in Geometrical and Physical Optics, pp. 153-157.

(Continued)

*Primary Examiner* — Joseph Martinez
*Assistant Examiner* — James R Greece
(74) *Attorney, Agent, or Firm* — Knobbe Martens Olson & Bear LLP

(57) ABSTRACT

A thin black mask is created using a single mask process. A dielectric layer is deposited over a substrate. An absorber layer is deposited over the dielectric layer and a reflector layer is deposited over the absorber layer. The absorber layer and the reflector layer are patterned using a single mask process.

9 Claims, 14 Drawing Sheets

U.S. PATENT DOCUMENTS

| | | | |
|---|---|---|---|
| 5,062,689 A | 11/1991 | Koehler | |
| 5,091,983 A | 2/1992 | Lukosz | |
| 5,096,279 A | 3/1992 | Hornbeck et al. | |
| 5,170,283 A | 12/1992 | O'Brien et al. | |
| 5,315,370 A | 5/1994 | Bulow | |
| 5,337,191 A | 8/1994 | Austin | |
| 5,381,232 A | 1/1995 | Van Wijk | |
| 5,422,310 A | 6/1995 | Ito | |
| 5,452,138 A | 9/1995 | Mignardi et al. | |
| 5,457,900 A | 10/1995 | Roy | |
| 5,471,341 A | 11/1995 | Warde et al. | |
| 5,526,172 A | 6/1996 | Kanack | |
| 5,559,358 A | 9/1996 | Burns et al. | |
| 5,561,523 A | 10/1996 | Blomberg et al. | |
| 5,636,052 A | 6/1997 | Arney et al. | |
| 5,638,084 A | 6/1997 | Kalt | |
| 5,646,729 A | 7/1997 | Koskinen et al. | |
| 5,646,768 A | 7/1997 | Kaeriyama | |
| 5,661,592 A | 8/1997 | Bornstein et al. | |
| 5,665,997 A | 9/1997 | Weaver et al. | |
| 5,699,181 A | 12/1997 | Choi | |
| 5,710,656 A | 1/1998 | Goosen | |
| 5,719,068 A | 2/1998 | Suzawa et al. | |
| 5,734,177 A | 3/1998 | Sakamoto | |
| 5,786,927 A | 7/1998 | Greywall et al. | |
| 5,796,378 A | 8/1998 | Yoshida | |
| 5,808,781 A | 9/1998 | Arney et al. | |
| 5,818,095 A | 10/1998 | Sampsell | |
| 5,825,528 A | 10/1998 | Goosen | |
| 5,835,256 A | 11/1998 | Huibers | |
| 5,838,484 A | 11/1998 | Goosen et al. | |
| 5,867,301 A | 2/1999 | Engle | |
| 5,867,302 A | 2/1999 | Fleming | |
| 5,894,686 A | 4/1999 | Parker et al. | |
| 5,914,804 A | 6/1999 | Goossen | |
| 5,920,418 A | 7/1999 | Shiono et al. | |
| 5,959,777 A | 9/1999 | Whitehead | |
| 5,961,848 A | 10/1999 | Jacquet et al. | |
| 6,028,689 A | 2/2000 | Michalicek et al. | |
| 6,040,937 A | 3/2000 | Miles | |
| 6,046,659 A | 4/2000 | Loo et al. | |
| 6,055,090 A | 4/2000 | Miles | |
| 6,100,861 A | 8/2000 | Cohen et al. | |
| 6,123,431 A | 9/2000 | Teragaki et al. | |
| 6,242,932 B1 | 6/2001 | Hembree | |
| 6,262,696 B1 | 7/2001 | Seraphim et al. | |
| 6,262,697 B1 | 7/2001 | Stephenson | |
| 6,282,010 B1 | 8/2001 | Sulzbach et al. | |
| 6,285,424 B1 * | 9/2001 | Yoshida | 349/110 |
| 6,327,071 B1 | 12/2001 | Kimura | |
| 6,335,235 B1 * | 1/2002 | Bhakta et al. | 438/221 |
| 6,356,378 B1 | 3/2002 | Huibers | |
| 6,377,233 B2 | 4/2002 | Colgan et al. | |
| 6,377,321 B1 | 4/2002 | Khan et al. | |
| 6,384,952 B1 | 5/2002 | Clark et al. | |
| 6,392,618 B1 | 5/2002 | Kimura et al. | |
| 6,433,917 B1 | 8/2002 | Mei et al. | |
| 6,438,282 B1 | 8/2002 | Takeda et al. | |
| 6,452,712 B2 | 9/2002 | Atobe et al. | |
| 6,466,354 B1 | 10/2002 | Gudeman | |
| 6,518,944 B1 | 2/2003 | Doane et al. | |
| 6,519,073 B1 | 2/2003 | Goossen | |
| 6,556,338 B2 | 4/2003 | Han et al. | |
| 6,574,033 B1 | 6/2003 | Chui et al. | |
| 6,597,490 B2 | 7/2003 | Tayebati | |
| 6,608,268 B1 | 8/2003 | Goldsmith | |
| 6,632,698 B2 | 10/2003 | Ives | |
| 6,650,455 B2 | 11/2003 | Miles | |
| 6,657,386 B2 | 12/2003 | Koshio et al. | |
| 6,657,832 B2 | 12/2003 | Williams et al. | |
| 6,661,561 B2 | 12/2003 | Fitzpatrick et al. | |
| 6,674,562 B1 | 1/2004 | Miles et al. | |
| 6,680,792 B2 | 1/2004 | Miles | |
| 6,698,295 B1 | 3/2004 | Sherrer | |
| 6,710,908 B2 | 3/2004 | Miles et al. | |
| 6,715,889 B2 | 4/2004 | Nishima et al. | |
| 6,753,937 B2 | 6/2004 | Grupp | |
| 6,778,034 B2 | 8/2004 | Nir et al. | |
| 6,784,956 B2 | 8/2004 | Matsumoto et al. | |
| 6,794,119 B2 | 9/2004 | Miles | |
| 6,813,059 B2 | 11/2004 | Hunter et al. | |
| 6,841,081 B2 | 1/2005 | Chang et al. | |
| 6,844,959 B2 | 1/2005 | Huibers et al. | |
| 6,849,471 B2 | 2/2005 | Patel et al. | |
| 6,862,127 B1 | 3/2005 | Ishii | |
| 6,867,896 B2 | 3/2005 | Miles | |
| 6,870,654 B2 | 3/2005 | Lin et al. | |
| 6,880,959 B2 | 4/2005 | Houston | |
| 6,882,458 B2 | 4/2005 | Lin et al. | |
| 6,882,461 B1 | 4/2005 | Tsai et al. | |
| 6,885,409 B2 | 4/2005 | Stephenson et al. | |
| 6,891,588 B2 | 5/2005 | Kawachi et al. | |
| 6,912,022 B2 | 6/2005 | Lin et al. | |
| 6,913,942 B2 | 7/2005 | Patel et al. | |
| 6,940,630 B2 | 9/2005 | Xie | |
| 6,947,200 B2 | 9/2005 | Huibers | |
| 6,952,303 B2 | 10/2005 | Lin et al. | |
| 6,958,847 B2 | 10/2005 | Lin | |
| 6,960,305 B2 | 11/2005 | Doan et al. | |
| 6,980,350 B2 | 12/2005 | Hung et al. | |
| 6,982,820 B2 | 1/2006 | Tsai | |
| 7,006,272 B2 | 2/2006 | Tsai | |
| 7,019,809 B2 | 3/2006 | Sekiguchi | |
| 7,027,204 B2 | 4/2006 | Trisnadi et al. | |
| 7,034,981 B2 | 4/2006 | Makigaki | |
| 7,042,625 B2 | 5/2006 | Hong et al. | |
| 7,046,422 B2 | 5/2006 | Kimura et al. | |
| 7,061,678 B1 | 6/2006 | Chikazawa | |
| 7,119,945 B2 | 10/2006 | Kothari et al. | |
| 7,123,216 B1 | 10/2006 | Miles | |
| 7,126,738 B2 | 10/2006 | Miles | |
| 7,130,104 B2 | 10/2006 | Cummings | |
| 7,135,643 B2 | 11/2006 | van Haaster et al. | |
| 7,184,195 B2 | 2/2007 | Yang | |
| 7,184,202 B2 | 2/2007 | Miles et al. | |
| 7,198,973 B2 | 4/2007 | Lin et al. | |
| 7,221,495 B2 | 5/2007 | Miles et al. | |
| 7,236,284 B2 | 6/2007 | Miles | |
| 7,245,285 B2 | 7/2007 | Yeh et al. | |
| 7,265,809 B2 | 9/2007 | Dunn et al. | |
| 7,277,143 B2 | 10/2007 | Funahata et al. | |
| 7,289,259 B2 | 10/2007 | Chui et al. | |
| 7,298,437 B2 | 11/2007 | Edwards et al. | |
| 7,302,157 B2 | 11/2007 | Chui | |
| 7,310,121 B2 | 12/2007 | Hirakata et al. | |
| 7,321,456 B2 | 1/2008 | Cummings | |
| 7,321,457 B2 | 1/2008 | Heald | |
| 7,324,176 B2 | 1/2008 | Dunn et al. | |
| 7,327,510 B2 | 2/2008 | Cummings et al. | |
| 7,372,613 B2 | 5/2008 | Chui et al. | |
| 7,372,619 B2 | 5/2008 | Miles | |
| 7,385,744 B2 | 6/2008 | Kogut et al. | |
| 7,385,762 B2 | 6/2008 | Cummings | |
| 7,400,488 B2 | 7/2008 | Lynch et al. | |
| 7,403,180 B1 | 7/2008 | Silverstein et al. | |
| 7,436,573 B2 | 10/2008 | Doan et al. | |
| 7,459,402 B2 | 12/2008 | Doan et al. | |
| 7,535,621 B2 | 5/2009 | Chiang | |
| 7,566,664 B2 | 7/2009 | Yan et al. | |
| 7,569,488 B2 | 8/2009 | Rafanan | |
| 7,612,933 B2 | 11/2009 | Djordjev | |
| 7,629,197 B2 | 12/2009 | Luo et al. | |
| 2001/0003487 A1 | 6/2001 | Miles | |
| 2001/0028503 A1 | 10/2001 | Flanders et al. | |
| 2001/0043171 A1 | 11/2001 | Van Gorkom et al. | |
| 2002/0006684 A1 * | 1/2002 | Terao et al. | 438/102 |
| 2002/0054424 A1 | 5/2002 | Miles | |
| 2002/0067446 A1 | 6/2002 | Wang | |
| 2002/0070931 A1 | 6/2002 | Ishikawa | |
| 2002/0075555 A1 | 6/2002 | Miles | |
| 2002/0114558 A1 | 8/2002 | Nemirovsky | |
| 2002/0126364 A1 | 9/2002 | Miles | |
| 2002/0139981 A1 | 10/2002 | Young | |
| 2002/0146200 A1 | 10/2002 | Kurdle et al. | |
| 2002/0149721 A1 | 10/2002 | Minoura et al. | |
| 2002/0149828 A1 | 10/2002 | Miles | |
| 2002/0149834 A1 | 10/2002 | Mei et al. | |

| | | |
|---|---|---|
| 2002/0154422 A1 | 10/2002 | Sniegowski et al. |
| 2002/0197761 A1 | 12/2002 | Patel et al. |
| 2003/0016428 A1 | 1/2003 | Kato et al. |
| 2003/0035196 A1 | 2/2003 | Walker |
| 2003/0043157 A1 | 3/2003 | Miles |
| 2003/0053078 A1 | 3/2003 | Missey et al. |
| 2003/0112507 A1 | 6/2003 | Divelbiss et al. |
| 2003/0119221 A1 | 6/2003 | Cunningham et al. |
| 2003/0123125 A1 | 7/2003 | Little |
| 2003/0128175 A1 | 7/2003 | Berstis |
| 2003/0138669 A1* | 7/2003 | Kojima et al. .......... 428/694 ST |
| 2003/0189528 A1 | 10/2003 | Antila et al. |
| 2003/0202265 A1 | 10/2003 | Reboa et al. |
| 2003/0202266 A1 | 10/2003 | Ring et al. |
| 2004/0008396 A1 | 1/2004 | Stappaerts |
| 2004/0008438 A1 | 1/2004 | Sato |
| 2004/0027671 A1 | 2/2004 | Wu et al. |
| 2004/0027701 A1 | 2/2004 | Ishikawa |
| 2004/0043552 A1 | 3/2004 | Strumpell et al. |
| 2004/0051929 A1 | 3/2004 | Sampsell et al. |
| 2004/0058532 A1 | 3/2004 | Miles et al. |
| 2004/0075967 A1 | 4/2004 | Lynch et al. |
| 2004/0076802 A1 | 4/2004 | Tompkin et al. |
| 2004/0080035 A1 | 4/2004 | Delapierre |
| 2004/0100594 A1 | 5/2004 | Huibers et al. |
| 2004/0100677 A1 | 5/2004 | Huibers et al. |
| 2004/0125281 A1 | 7/2004 | Lin et al. |
| 2004/0125282 A1 | 7/2004 | Lin et al. |
| 2004/0135947 A1 | 7/2004 | Jang et al. |
| 2004/0145811 A1 | 7/2004 | Lin et al. |
| 2004/0147198 A1 | 7/2004 | Lin et al. |
| 2004/0175577 A1 | 9/2004 | Lin et al. |
| 2004/0184134 A1 | 9/2004 | Makigaki |
| 2004/0189588 A1 | 9/2004 | Dong et al. |
| 2004/0207897 A1 | 10/2004 | Lin |
| 2004/0209195 A1 | 10/2004 | Lin |
| 2004/0217919 A1 | 11/2004 | Piehl et al. |
| 2004/0218251 A1 | 11/2004 | Piehl et al. |
| 2004/0240032 A1 | 12/2004 | Miles |
| 2005/0002082 A1 | 1/2005 | Miles |
| 2005/0003667 A1 | 1/2005 | Lin et al. |
| 2005/0024557 A1 | 2/2005 | Lin |
| 2005/0035699 A1 | 2/2005 | Tsai |
| 2005/0036095 A1 | 2/2005 | Yeh et al. |
| 2005/0046919 A1 | 3/2005 | Taguchi et al. |
| 2005/0046922 A1 | 3/2005 | Lin et al. |
| 2005/0046948 A1 | 3/2005 | Lin |
| 2005/0068627 A1 | 3/2005 | Nakamura et al. |
| 2005/0078348 A1 | 4/2005 | Lin |
| 2005/0122294 A1 | 6/2005 | Ben-David et al. |
| 2005/0168849 A1 | 8/2005 | Lin |
| 2005/0179378 A1 | 8/2005 | Oooka et al. |
| 2005/0195370 A1 | 9/2005 | Gore et al. |
| 2005/0195462 A1 | 9/2005 | Lin |
| 2005/0225686 A1 | 10/2005 | Brummack et al. |
| 2005/0249966 A1 | 11/2005 | Tung et al. |
| 2005/0253820 A1 | 11/2005 | Horiuchi |
| 2006/0007517 A1 | 1/2006 | Tsai |
| 2006/0017379 A1 | 1/2006 | Su et al. |
| 2006/0017689 A1 | 1/2006 | Faase et al. |
| 2006/0024880 A1 | 2/2006 | Chui et al. |
| 2006/0065940 A1 | 3/2006 | Kothari |
| 2006/0066599 A1 | 3/2006 | Chui |
| 2006/0066640 A1 | 3/2006 | Kothari et al. |
| 2006/0066641 A1 | 3/2006 | Gally et al. |
| 2006/0066936 A1 | 3/2006 | Chui et al. |
| 2006/0067649 A1 | 3/2006 | Tung et al. |
| 2006/0067651 A1 | 3/2006 | Chui |
| 2006/0077152 A1 | 4/2006 | Chui et al. |
| 2006/0077155 A1 | 4/2006 | Chui et al. |
| 2006/0077156 A1 | 4/2006 | Chui et al. |
| 2006/0079048 A1 | 4/2006 | Sampsell |
| 2006/0082863 A1 | 4/2006 | Piehl et al. |
| 2006/0091824 A1 | 5/2006 | Pate et al. |
| 2006/0220160 A1 | 10/2006 | Miles |
| 2006/0250326 A1 | 11/2006 | Wampler |
| 2006/0262126 A1 | 11/2006 | Miles |
| 2006/0262380 A1 | 11/2006 | Miles |
| 2006/0262562 A1 | 11/2006 | Fukusawa et al. |
| 2006/0268388 A1 | 11/2006 | Miles |
| 2006/0274398 A1 | 12/2006 | Chou |
| 2007/0020948 A1 | 1/2007 | Piehl et al. |
| 2007/0077525 A1 | 4/2007 | Davis et al. |
| 2007/0086078 A1 | 4/2007 | Hagood et al. |
| 2007/0121118 A1 | 5/2007 | Gally et al. |
| 2007/0138608 A1 | 6/2007 | Ikehashi |
| 2007/0177247 A1 | 8/2007 | Miles |
| 2007/0190886 A1* | 8/2007 | Satoh et al. ............... 445/24 |
| 2007/0194630 A1 | 8/2007 | Mignard et al. |
| 2007/0216987 A1 | 9/2007 | Hagood et al. |
| 2007/0229936 A1 | 10/2007 | Miles |
| 2007/0268201 A1 | 11/2007 | Sampsell et al. |
| 2007/0268211 A1 | 11/2007 | Whitehead et al. |
| 2007/0279729 A1 | 12/2007 | Kothari et al. |
| 2007/0285761 A1* | 12/2007 | Zhong et al. ................ 359/291 |
| 2008/0002299 A1 | 1/2008 | Thurn |
| 2008/0013144 A1 | 1/2008 | Chui et al. |
| 2008/0013145 A1 | 1/2008 | Chui et al. |
| 2008/0013154 A1 | 1/2008 | Chui |
| 2008/0030657 A1 | 2/2008 | Wu et al. |
| 2008/0037093 A1 | 2/2008 | Miles |
| 2008/0055705 A1 | 3/2008 | Kothari |
| 2008/0055706 A1 | 3/2008 | Chui et al. |
| 2008/0055707 A1 | 3/2008 | Kogut et al. |
| 2008/0080043 A1 | 4/2008 | Chui et al. |
| 2008/0088904 A1 | 4/2008 | Miles |
| 2008/0088910 A1 | 4/2008 | Miles |
| 2008/0088911 A1 | 4/2008 | Miles |
| 2008/0088912 A1 | 4/2008 | Miles |
| 2008/0094690 A1 | 4/2008 | Luo et al. |
| 2008/0106782 A1 | 5/2008 | Miles |
| 2008/0110855 A1 | 5/2008 | Cummings |
| 2008/0112035 A1 | 5/2008 | Cummings |
| 2008/0112036 A1 | 5/2008 | Cummings |
| 2008/0186581 A1 | 8/2008 | Bita et al. |
| 2008/0218834 A1 | 9/2008 | Wang |
| 2008/0239455 A1 | 10/2008 | Kogut et al. |
| 2008/0247028 A1 | 10/2008 | Chui et al. |
| 2008/0278787 A1 | 11/2008 | Sasagawa |
| 2008/0278788 A1 | 11/2008 | Sasagawa |
| 2008/0297880 A1 | 12/2008 | Steckl et al. |
| 2008/0316566 A1 | 12/2008 | Lan |
| 2008/0316568 A1 | 12/2008 | Griffiths et al. |
| 2009/0009845 A1 | 1/2009 | Endisch et al. |
| 2009/0068781 A1 | 3/2009 | Tung et al. |
| 2009/0073534 A1 | 3/2009 | Lee et al. |
| 2009/0073539 A1 | 3/2009 | Mignard |
| 2009/0080060 A1 | 3/2009 | Sampsell et al. |
| 2009/0103166 A1 | 4/2009 | Khazeni et al. |
| 2009/0103168 A1 | 4/2009 | Sampsell |
| 2009/0135465 A1 | 5/2009 | Chui |
| 2009/0147343 A1 | 6/2009 | Kogut et al. |
| 2009/0201566 A1 | 8/2009 | Kothari |
| 2009/0213450 A1 | 8/2009 | Sampsell |
| 2009/0213451 A1 | 8/2009 | Tung et al. |
| 2009/0225395 A1 | 9/2009 | Ganti et al. |
| 2009/0231666 A1 | 9/2009 | Gudlavalleti et al. |
| 2009/0251761 A1 | 10/2009 | Khazeni et al. |
| 2009/0256218 A1 | 10/2009 | Mignard et al. |
| 2009/0273823 A1 | 11/2009 | Tung et al. |
| 2009/0273824 A1 | 11/2009 | Sasagawa |
| 2009/0279162 A1 | 11/2009 | Chui |
| 2010/0014148 A1 | 1/2010 | Djordjev |
| 2010/0039370 A1 | 2/2010 | Miles |
| 2010/0080890 A1 | 4/2010 | Tung et al. |
| 2010/0085626 A1 | 4/2010 | Tung et al. |
| 2010/0118382 A1 | 5/2010 | Kothari et al. |

FOREIGN PATENT DOCUMENTS

| | | |
|---|---|---|
| EP | 1 030 340 | 8/2000 |
| EP | 1 122 577 | 8/2001 |
| EP | 1 227 346 | 7/2002 |
| EP | 1 275 997 | 1/2003 |
| EP | 1 439 515 | 7/2004 |
| EP | 1 473 581 | 11/2004 |
| EP | 1 847 864 | 10/2007 |
| JP | 04-309925 | 2/1992 |
| JP | 5-49238 | 2/1993 |

| | | |
|---|---|---|
| JP | 5-281479 | 10/1993 |
| JP | 11211999 | 8/1999 |
| JP | 2002-062490 | 2/2000 |
| JP | 2001-221913 | 8/2001 |
| JP | 2001 249283 | 9/2001 |
| JP | 2002-221678 | 8/2002 |
| JP | 2003-340795 | 2/2003 |
| JP | 2004-012642 | 1/2004 |
| JP | 2004-212638 | 7/2004 |
| JP | 2004-212680 | 7/2004 |
| JP | 2005 279831 | 10/2005 |
| JP | 2005-308871 | 11/2005 |
| WO | WO 94/22045 | 9/1994 |
| WO | WO 98/14804 | 4/1998 |
| WO | WO 02/086582 | 10/2002 |
| WO | WO 03/105198 | 12/2003 |
| WO | WO 2004/042687 | 5/2004 |
| WO | WO 2007/036422 | 4/2007 |
| WO | WO 2007/053438 | 5/2007 |
| WO | WO 2007/072998 | 6/2007 |

OTHER PUBLICATIONS

Tolansky, 1948, Chapter II: Multiple-Beam Interference, in Multiple-bean Interferometry of Surfaces and Films, Oxford at the Clarendon Press, pp. 8-11.

ISR and WO in PCT/US09/039680, dated Jul. 16, 2009.

Aratani et al., "Process and Design Considerations for Surface Micromachined Beams for a Tuneable Interferometer Array in Silicon," Proc. IEEE Microelectromechanical Workshop, Fort Lauderdale, FL, pp. 230-235 (Feb. 1993).

Aratani K., et al., "Surface micromachined tuneable interferometer array," Sensors and Actuators, pp. 17-23. (1994).

Conner, "Hybrid Color Display Using Optical Interference Filter Array," SID Digest, pp. 577-580 (1993).

Feenstra et al., Electrowetting displays, Liquivista BV, 16 pp., Jan. 2006.

Jerman et al., "A Miniature Fabry-Perot Interferometer with a Corrugated Silicon Diaphragm Support", (1988).

Jerman et al., "Miniature Fabry-Perot Interferometers Micromachined in Silicon for Use in Optical Fiber WDM Systems," Transducers, San Francisco, Jun. 24-27, 1991, Proceedings on the Int'l. Conf. on Solid State Sensors and Actuators, vol. CONF. 6, Jun. 24, 1991, pp. 372-375.

Lezec, Submicrometer dimple array based interference color field displays and sensors, Nano Lett. 7(2):329-333, Dec. 23, 2006.

Miles, A New Reflective FPD Technology Using Interferometric Modulation, Journal of the SID, 5/4, 1997.

Taii et al., "A transparent sheet display by plastic MEMS," Journal of the SID 14(8):735-741, 2006.

Pape et al., Characteristics of the deformable mirror device for optical information processing, Optical Engineering, 22(6):676-681, Nov.-Dec. 1983.

Kowarz et al., Conformal grating electromechanical system (GEMS) for high-speed digital light modulation, Proceedings of the IEEE 15th. Annual International Conference on Micro Electro Mechanical Systems, MEMS 2002, pp. 568-573.

Miles, Interferometric modulation: MOEMS as an enabling technology for high performance reflective displays, Proceedings of SPIE, vol. 4985, pp. 131-139, 2003.

* cited by examiner

|  | Column Output Signals | |
|---|---|---|
|  | $+V_{bias}$ | $-V_{bias}$ |
| Row Output Signals  0 | Stable | Stable |
| $+\Delta V$ | Relax | Actuate |
| $-\Delta V$ | Actuate | Relax |

Table 1a Optical design for a thin BM stack

| Layers | material | Thickness (A) |
|---|---|---|
| substrate | glass | infinite |
| High index dielectric | SiNx | 200 |
| absorber | a-Si | 175,225,275 |
| reflector | Cr | 600 |
| media | air | infinite |

Table 1b Optical Performance for a-Si=225A

| | simulation | experiment |
|---|---|---|
| Y | 1.9% | ~2.6% |

Table 1a Optical design for a thin BM stack

| Layers | material | Thickness (A) |
|---|---|---|
| substrate | glass | infinite |
| High index dielectric | SiNx | 600 |
| absorber | a-Si | 140 |
| reflectors | Mo/Al | 300/100 |
| Buffer | SiO2 | Varying (0-1um) |
| media | air | infinite |

Table 1b Optical Performance

| | simulation |
|---|---|
| Y | 0.7% |

DEVICE HAVING THIN BLACK MASK AND METHOD OF FABRICATING THE SAME

BACKGROUND

1. Field of the Invention

The field of the invention relates to an interferometric thin film stack that may be used as blackmask for optical devices, such as various display and optoelectronic devices which have non-active areas which are required to be light-absorbing (e.g., such as MEMS-based, LCD, LED, and plasma displays).

2. Description of the Related Technology

Microelectromechanical systems (MEMS) include micro mechanical elements, actuators, and electronics. Micromechanical elements may be created using deposition, etching, and/or other micromachining processes that etch away parts of substrates and/or deposited material layers or that add layers to form electrical and electromechanical devices. One type of MEMS device is called an interferometric modulator. As used herein, the term interferometric modulator or interferometric light modulator refers to a device that selectively absorbs and/or reflects light using the principles of optical interference. In certain embodiments, an interferometric modulator may comprise a pair of conductive plates, one or both of which may be transparent and/or reflective in whole or part and capable of relative motion upon application of an appropriate electrical signal. In a particular embodiment, one plate may comprise a stationary layer deposited on a substrate and the other plate may comprise a metallic membrane separated from the stationary layer by an air gap. As described herein in more detail, the position of one plate in relation to another can change the optical interference of light incident on the interferometric modulator. Such devices have a wide range of applications, and it would be beneficial in the art to utilize and/or modify the characteristics of these types of devices so that their features can be exploited in improving existing products and creating new products that have not yet been developed.

SUMMARY

In one embodiment, a device comprises a black mask wherein a step size resulting from patterning of the black mask is less than 600 angstroms, and the reflectance of the black mask is less than one percent of incoming light.

In another embodiment, a device comprises a black mask wherein the black mask comprises at least 3 stacked layers on a substrate, the layers having increasing ratios of extinction coefficient over refractive index, starting from the substrate.

In another embodiment, a method of making a black mask comprises depositing a dielectric layer on a substrate, depositing an absorber layer on the dielectric layer, depositing a reflector layer on the absorber layer, and patterning the absorber layer and the reflector layer in a single mask process.

In another embodiment, a device comprises a black mask having a dielectric layer, an absorber layer, and a reflector layer wherein the dielectric layer comprises silicon nitride, the absorber layer comprises at least one of: silicon and germanium, and the reflector layer comprises at least one of: chromium, aluminum, and molybdenum.

In another embodiment, a device comprises a substrate, a black mask deposited over the substrate, the black masking comprising a dielectric layer deposited over the substrate, an absorber layer deposited over the dielectric layer, and a reflector layer deposited over the absorber layer.

DETAILED DESCRIPTION

Figure 1:
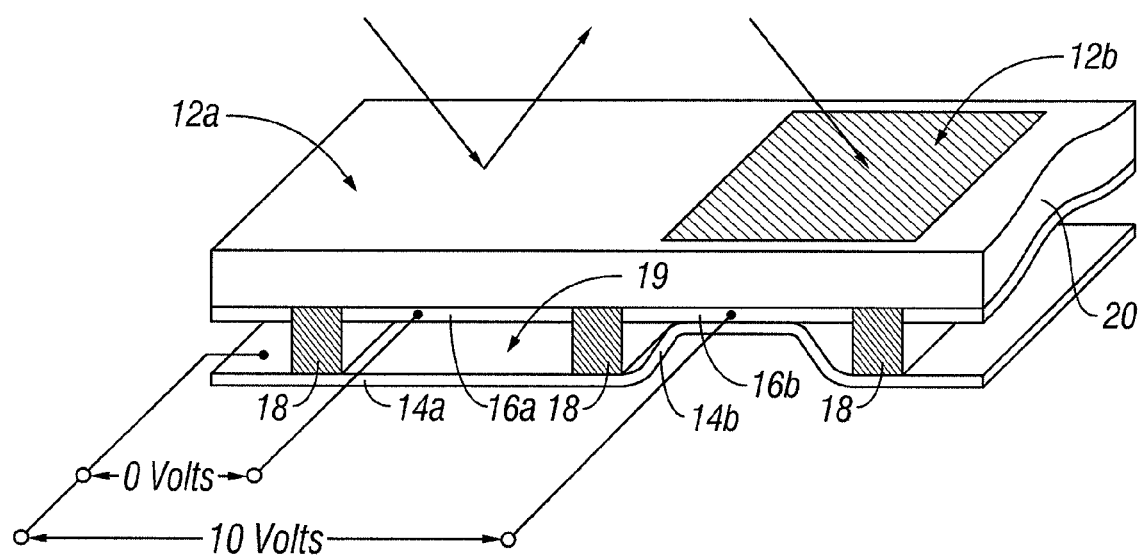
FIG. 1 is an isometric view depicting a portion of one embodiment of an interferometric modulator display in which a movable reflective layer of a first interferometric modulator is in a relaxed position and a movable reflective layer of a second interferometric modulator is in an actuated position.

The following detailed description is directed to certain specific embodiments. However, other embodiments may be used and some elements can be embodied in a multitude of different ways. In this description, reference is made to the drawings wherein like parts are designated with like numerals throughout. As will be apparent from the following description, the embodiments may be implemented in any device that is configured to display an image, whether in motion (e.g., video) or stationary (e.g., still image), and whether textual or pictorial. More particularly, it is contemplated that the embodiments may be implemented in or associated with a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices.

The desire for thinner, cheaper mobile device displays that maintain the visual quality of previous displays may be facilitated in part by minimizing the thickness of optical masks used in the displays. For these and other reasons, it may be desirable to decrease the thickness of the display and decrease the cost of the display while minimizing the amount of additional passive or non-active optical contents in the display. In one embodiment, an optical component that acts as a thin optical mask, e.g., a "thin black mask," absorbs ambient or stray light and improves the optical response of a display device by increasing the contrast ratio. A thin black mask may have a "step size" of less then six hundred angstroms. "Step size" refers to the total thickness of the absorber layer and the reflector layer of a black mask. In some applications, the thin mask can reflect light of a predetermined wavelength to appear as a color other than black. In one embodiment, a MEMS display device, for example, an array of interferometric modulators, comprises a dynamic optical component (e.g., a dynamic interferometric modulator) and a static optical component (e.g., a static interferometric modulator) laterally offset from the dynamic optical component. The static optical component functions as the "black mask" to absorb ambient or stray light in non-active areas of a display to improve the optical response of the dynamic optical component. For example, non-active areas can include one or more areas of a MEMS display device other than the area corresponding to a movable reflective layer. A non-active area can also include an area of a display device that is not used to display an image or data rendered on the display device.

Although a MEMS device, which includes an interferometric modulator, will be used to illustrate one embodiment, it is to be understood that portions of the present disclosure may be applied to other optical devices such as various imaging display and optoelectronic devices in general, which have non-active areas which are required to be light-absorbing, but which do not include interferometric modulators (e.g., LCD, LED and plasma displays). As will be apparent from the following description, portions of the present disclosure may be implemented in any device that is configured to display an image, whether in motion (e.g., video) or stationary (e.g., still image), and whether textual or pictorial. More particularly, the present disclosure may be applied to a variety of electronic devices such as, but not limited to, mobile telephones, wireless devices, personal data assistants (PDAs), hand-held or portable computers, GPS receivers/navigators, cameras, MP3 players, camcorders, game consoles, wrist watches, clocks, calculators, television monitors, flat panel displays, computer monitors, auto displays (e.g., odometer display, etc.), cockpit controls and/or displays, display of camera views (e.g., display of a rear view camera in a vehicle), electronic photographs, electronic billboards or signs, projectors, architectural structures, packaging, and aesthetic structures (e.g., display of images on a piece of jewelry). MEMS devices of similar structure to those described herein can also be used in non-display applications such as in electronic switching devices. In addition, the present disclosure is not in any way limited to use in visual display devices.

One interferometric modulator display embodiment comprising an interferometric MEMS display element is illustrated in FIG. 1. In these devices, the pixels are in either a bright or dark state. In the bright ("on" or "open") state, the display element reflects a large portion of incident visible light to a user. When in the dark ("off" or "closed") state, the display element reflects little incident visible light to the user. Depending on the embodiment, the light reflectance properties of the "on" and "off" states may be reversed. MEMS pixels can be configured to reflect predominantly at selected colors, allowing for a color display in addition to black and white.

FIG. 1 is an isometric view depicting two adjacent pixels in a series of pixels of a visual display, wherein each pixel comprises a MEMS interferometric modulator. In some embodiments, an interferometric modulator display comprises a row/column array of these interferometric modulators. Each interferometric modulator includes a pair of reflective layers positioned at a variable and controllable distance from each other to form a resonant optical gap with at least one variable dimension. In one embodiment, one of the reflective layers may be moved between two positions. In the first position, referred to herein as the relaxed position, the movable reflective layer is positioned at a relatively large distance from a fixed partially reflective layer. In the second position, referred to herein as the actuated position, the movable reflective layer is positioned more closely adjacent to the partially reflective layer. Incident light that reflects from the two layers interferes constructively or destructively depending on the position of the movable reflective layer, producing either an overall reflective or non-reflective state for each pixel.

The depicted portion of the pixel array in FIG. 1 includes two adjacent interferometric modulators 12a and 12b. In the interferometric modulator 12a on the left, a movable reflective layer 14a is illustrated in a relaxed position at a predetermined distance from an optical stack 16a, which includes a partially reflective layer. In the interferometric modulator 12b on the right, the movable reflective layer 14b is illustrated in an actuated position adjacent to the optical stack 16b.

The optical stacks 16a and 16b (collectively referred to as optical stack 16), as referenced herein, typically comprise several fused layers, which can include an electrode layer, such as indium tin oxide (ITO), a partially reflective layer, such as chromium, and a transparent dielectric. The optical stack 16 is thus electrically conductive, partially transparent, and partially reflective, and may be fabricated, for example, by depositing one or more of the above layers onto a transparent substrate 20. The partially reflective layer can be formed from a variety of materials that are partially reflective such as various metals, semiconductors, and dielectrics. The partially reflective layer can be formed of one or more layers of materials, and each of the layers can be formed of a single material or a combination of materials.

In some embodiments, the layers of the optical stack 16 are patterned into parallel strips, and may form row electrodes in a display device as described further below. The movable reflective layers 14a, 14b may be formed as a series of parallel strips of a deposited metal layer or layers (orthogonal to the row electrodes of 16a, 16b) deposited on top of posts 18 and an intervening sacrificial material deposited between the posts 18. When the sacrificial material is etched away, the movable reflective layers 14a, 14b are separated from the optical stacks 16a, 16b by a defined gap 19. A highly conductive and reflective material such as aluminum may be used for the reflective layers 14, and these strips may form column electrodes in a display device.

With no applied voltage, the gap 19 remains between the movable reflective layer 14a and optical stack 16a, with the movable reflective layer 14a in a mechanically relaxed state, as illustrated by the pixel 12a in FIG. 1. However, when a potential difference is applied to a selected row and column, the capacitor formed at the intersection of the row and column electrodes at the corresponding pixel becomes charged, and electrostatic forces pull the electrodes together. If the voltage is high enough, the movable reflective layer 14 is deformed and is forced against the optical stack 16. A dielectric layer (not illustrated in this Figure) within the optical stack 16 may prevent shorting and control the separation distance between layers 14 and 16, as illustrated by pixel 12b on the right in FIG. 1. The behavior is the same regardless of the polarity of the applied potential difference. In this way, row/column actuation that can control the reflective vs. non-reflective pixel states is analogous in many ways to that used in conventional LCD and other display technologies.

FIGS. 2 through 5B illustrate one exemplary process and system for using an array of interferometric modulators in a display application.

Figure 2:
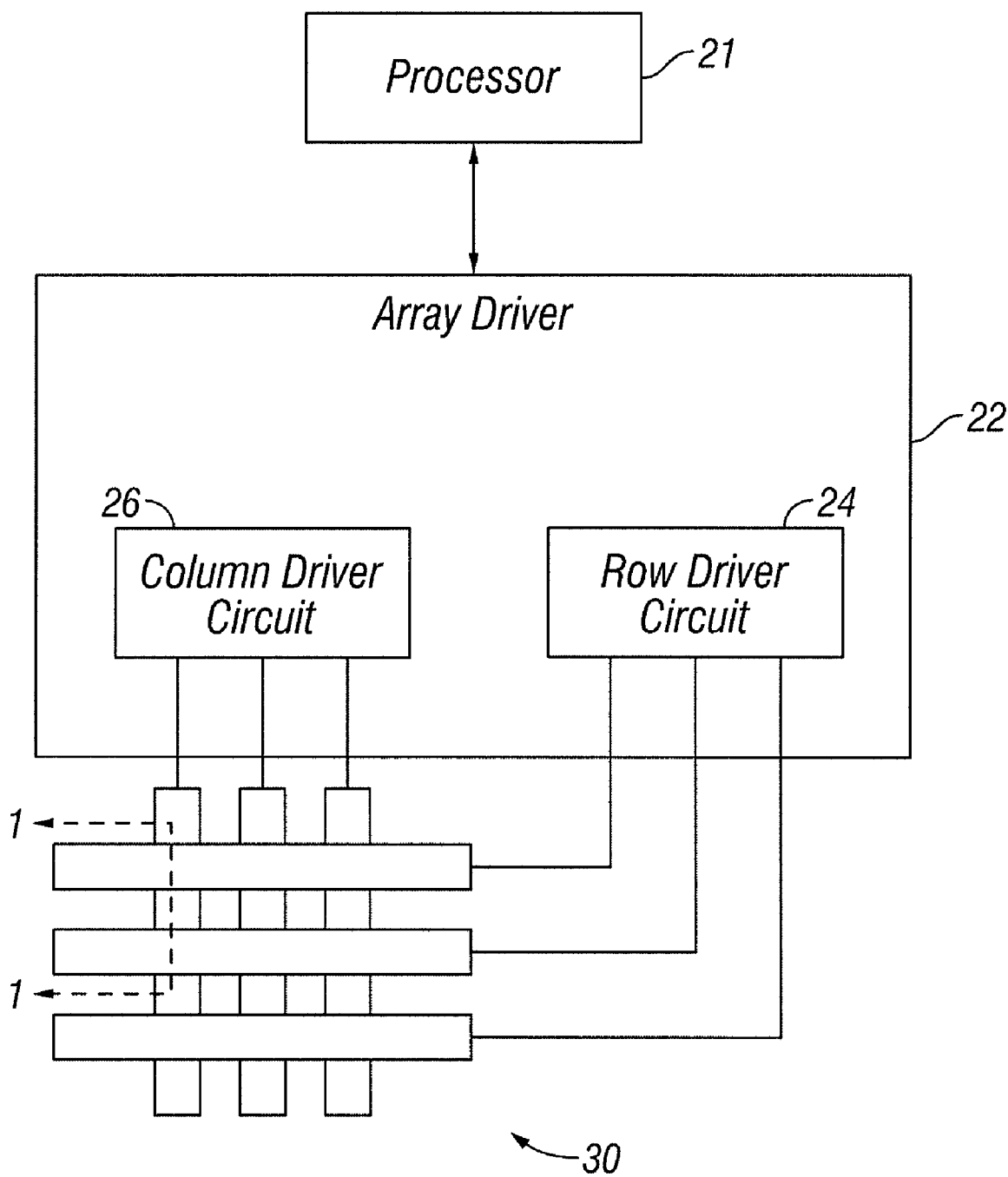
FIG. 2 is a system block diagram illustrating one embodiment of an electronic device incorporating a 3×3 interferometric modulator display.

FIG. 2 is a system block diagram illustrating one embodiment of an electronic device that may incorporate aspects of the invention. In the exemplary embodiment, the electronic device includes a processor 21 which may be any general purpose single- or multi-chip microprocessor such as an ARM, Pentium®, Pentium II®, Pentium III®, Pentium IV®, Pentium® Pro, an 8051, a MIPS®, a Power PC®, an ALPHA®, or any special purpose microprocessor such as a digital signal processor, microcontroller, or a programmable gate array. As is conventional in the art, the processor 21 may be configured to execute one or more software modules. In addition to executing an operating system, the processor may be configured to execute one or more software applications, including a web browser, a telephone application, an email program, or any other software application.

In one embodiment, the processor 21 is also configured to communicate with an array driver 22. In one embodiment, the array driver 22 includes a row driver circuit 24 and a column driver circuit 26 that provide signals to a display array or panel 30. The cross section of the array illustrated in FIG. 1 is shown by the lines 1-1 in FIG. 2. For MEMS interferometric modulators, the row/column actuation protocol may take advantage of a hysteresis property of these devices illustrated in FIG. 3. It may require, for example, a 10 volt potential difference to cause a movable layer to deform from the relaxed state to the actuated state. However, when the voltage is reduced from that value, the movable layer maintains its state as the voltage drops back below 10 volts. In the exemplary embodiment of FIG. 3, the movable layer does not relax completely until the voltage drops below 2 volts. Thus, there exists a window of applied voltage, about 3 to 7 V in the example illustrated in FIG. 3, within which the device is stable in either the relaxed or actuated state. This is referred to herein as the "hysteresis window" or "stability window." For a display array having the hysteresis characteristics of FIG. 3, the row/column actuation protocol can be designed such that during row strobing, pixels in the strobed row that are to be actuated are exposed to a voltage difference of about 10 volts, and pixels that are to be relaxed are exposed to a voltage difference of close to zero volts. After the strobe, the pixels are exposed to a steady state voltage difference of about 5 volts such that they remain in whatever state the row strobe put them in. After being written, each pixel sees a potential difference within the "stability window" of 3-7 volts in this example. This feature makes the pixel design illustrated in FIG. 1 stable under the same applied voltage conditions in either an actuated or relaxed pre-existing state. Since each pixel of the interferometric modulator, whether in the actuated or relaxed state, is essentially a capacitor formed by the fixed and moving reflective layers, this stable state can be held at a voltage within the hysteresis window with almost no power dissipation. Essentially no current flows into the pixel if the applied potential is fixed.

In typical applications, a display frame may be created by asserting the set of column electrodes in accordance with the desired set of actuated pixels in the first row. A row pulse is then applied to the row 1 electrode, actuating the pixels corresponding to the asserted column lines. The asserted set of column electrodes is then changed to correspond to the desired set of actuated pixels in the second row. A pulse is then applied to the row 2 electrode, actuating the appropriate pixels in row 2 in accordance with the asserted column electrodes. The row 1 pixels are unaffected by the row 2 pulse, and remain in the state they were set to during the row 1 pulse. This may be repeated for the entire series of rows in a sequential fashion to produce the frame. Generally, the frames are refreshed and/or updated with new display data by continually repeating this process at some desired number of frames per second. A wide variety of protocols for driving row and column electrodes of pixel arrays to produce display frames are also well known and may be used in conjunction with the present invention.

Figures 3, 4:
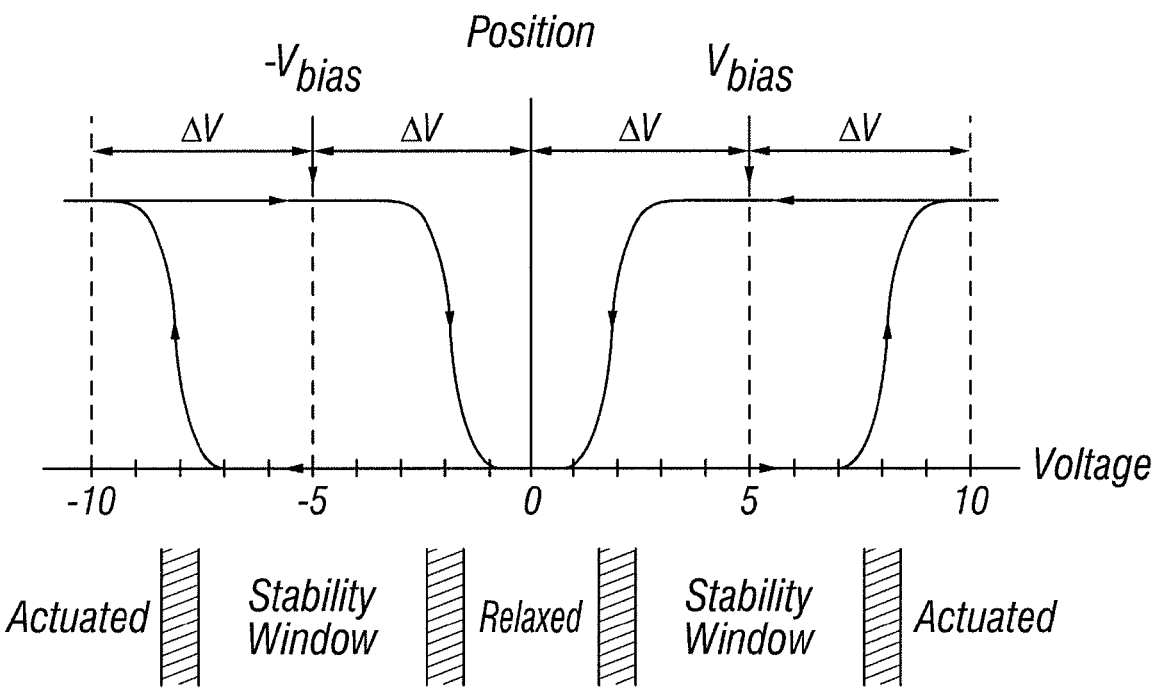
FIG. 3 is a diagram of movable mirror position versus applied voltage for one exemplary embodiment of an interferometric modulator of FIG. 1.
FIG. 4 is an illustration of a set of row and column voltages that may be used to drive an interferometric modulator display.
Figure 5A:
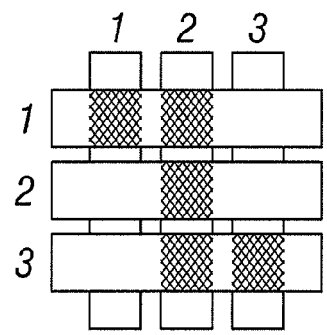
FIG. 5A illustrates one exemplary frame of display data in the 3×3 interferometric modulator display of FIG. 2.
Figure 5B:
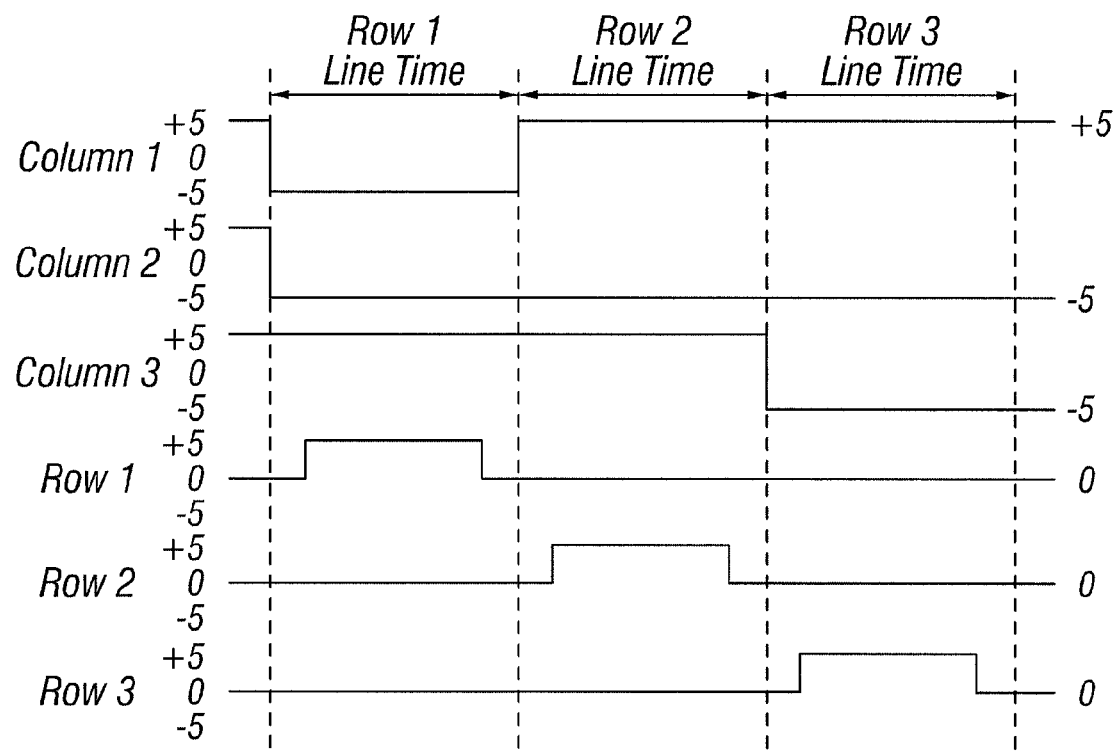
FIG. 5B illustrates one exemplary timing diagram for row and column signals that may be used to write the frame of FIG. 5A.

FIGS. 4, 5A, and 5B illustrate one possible actuation protocol for creating a display frame on the 3×3 array of FIG. 2. FIG. 4 illustrates a possible set of column and row voltage levels that may be used for pixels exhibiting the hysteresis curves of FIG. 3. In the FIG. 4 embodiment, actuating a pixel involves setting the appropriate column to $-V_{bias}$, and the appropriate row to $+\Delta V$, which may correspond to −5 volts and +5 volts, respectively. Relaxing the pixel is accomplished by setting the appropriate column to $+V_{bias}$, and the appropriate row to the same $+\Delta V$, producing a zero volt potential difference across the pixel. In those rows where the row voltage is held at zero volts, the pixels are stable in whatever state they were originally in, regardless of whether the column is at $+V_{bias}$, or $-V_{bias}$. As is also illustrated in FIG. 4, it will be appreciated that voltages of opposite polarity than those described above can be used, e.g., actuating a pixel can involve setting the appropriate column to $+V_{bias}$, and the appropriate row to $-\Delta V$. In this embodiment, releasing the pixel is accomplished by setting the appropriate column to $-V_{bias}$, and the appropriate row to the same $-\Delta V$, producing a zero volt potential difference across the pixel.

FIG. 5B is a timing diagram showing a series of row and column signals applied to the 3×3 array of FIG. 2 which will result in the display arrangement illustrated in FIG. 5A, where actuated pixels are non-reflective. Prior to writing the frame illustrated in FIG. 5A, the pixels can be in any state, and in this example, all the rows are at 0 volts, and all the columns are at +5 volts. With these applied voltages, all pixels are stable in their existing actuated or relaxed states.

In the FIG. 5A frame, pixels (1,1), (1,2), (2,2), (3,2) and (3,3) are actuated. To accomplish this, during a "line time" for row 1, columns 1 and 2 are set to −5 volts, and column 3 is set to +5 volts. This does not change the state of any pixels, because all the pixels remain in the 3-7 volt stability window. Row 1 is then strobed with a pulse that goes from 0, up to 5 volts, and back to zero. This actuates the (1,1) and (1,2) pixels and relaxes the (1,3) pixel. No other pixels in the array are affected. To set row 2 as desired, column 2 is set to −5 volts, and columns 1 and 3 are set to +5 volts. The same strobe applied to row 2 will then actuate pixel (2,2) and relax pixels (2,1) and (2,3). Again, no other pixels of the array are affected. Row 3 is similarly set by setting columns 2 and 3 to −5 volts, and column 1 to +5 volts. The row 3 strobe sets the row 3 pixels as shown in FIG. 5A. After writing the frame, the row potentials are zero, and the column potentials can remain at either +5 or −5 volts, and the display is then stable in the arrangement of FIG. 5A. It will be appreciated that the same procedure can be employed for arrays of dozens or hundreds of rows and columns. It will also be appreciated that the timing, sequence, and levels of voltages used to perform row and column actuation can be varied widely within the general principles outlined above, and the above example is exemplary only, and any actuation voltage method can be used with the systems and methods described herein.

Figure 6A:
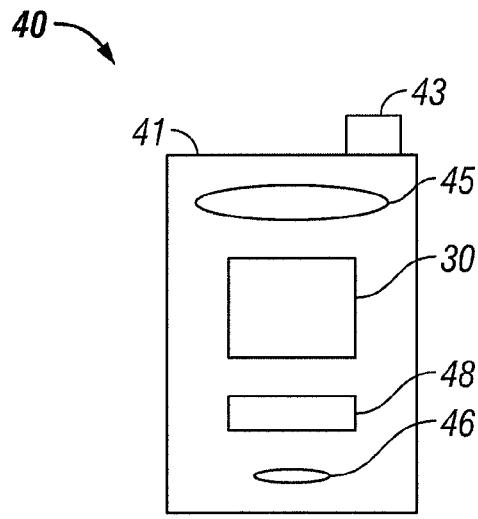
FIGS. 6A and 6B are system block diagrams illustrating an embodiment of a visual display device comprising a plurality of interferometric modulators.
Figure 6B:
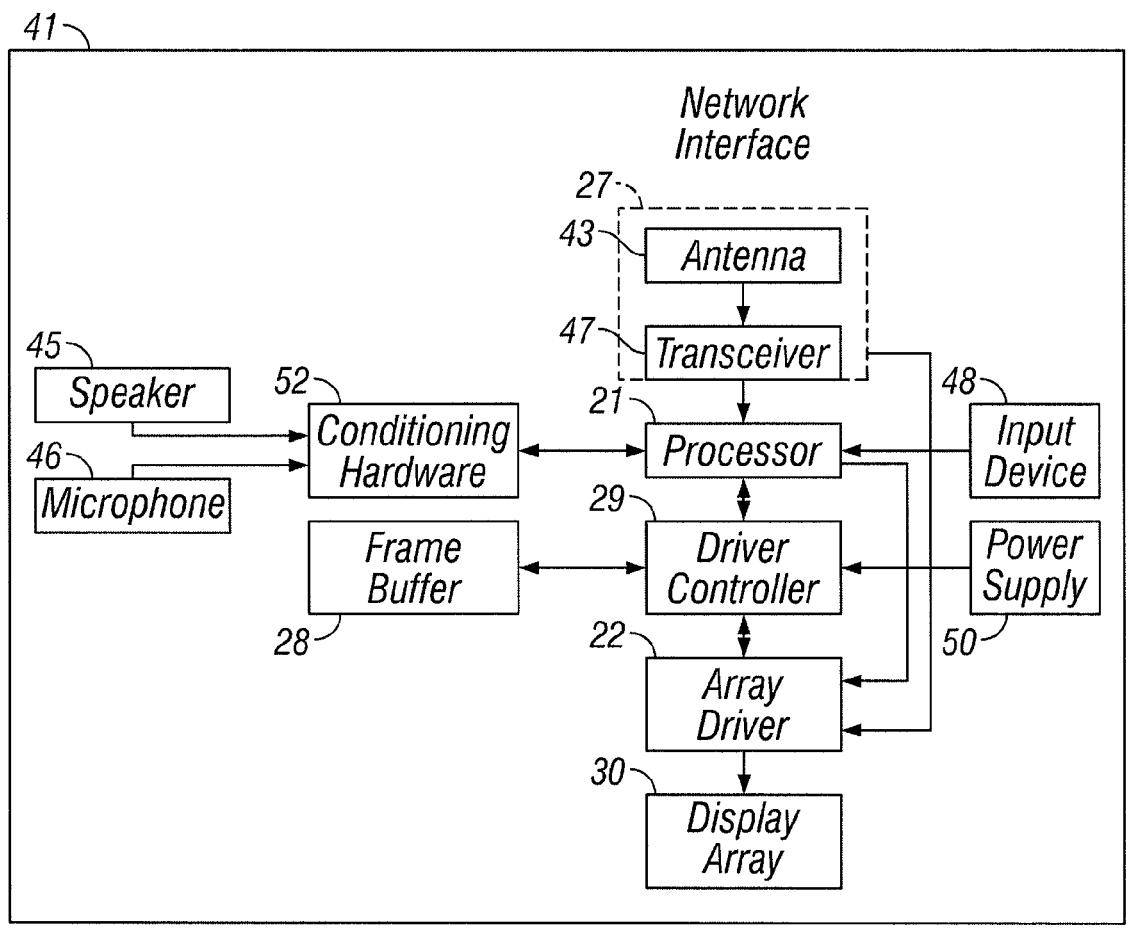

FIGS. 6A and 6B are system block diagrams illustrating an embodiment of a display device 40. The display device 40 can be, for example, a cellular or mobile telephone. However, the same components of display device 40 or slight variations thereof are also illustrative of various types of display devices such as televisions and portable media players.

The display device 40 includes a housing 41, a display 30, an antenna 43, a speaker 45, an input device 48, and a microphone 46. The housing 41 is generally formed from any of a variety of manufacturing processes as are well known to those of skill in the art, including injection molding and vacuum forming. In addition, the housing 41 may be made from any of a variety of materials, including, but not limited to, plastic, metal, glass, rubber, and ceramic, or a combination thereof. In one embodiment, the housing 41 includes removable portions (not shown) that may be interchanged with other removable portions of different color, or containing different logos, pictures, or symbols.

The display 30 of exemplary display device 40 may be any of a variety of displays, including a bi-stable display, as described herein. In other embodiments, the display 30 includes a flat-panel display, such as plasma, EL, OLED, STN LCD, or TFT LCD as described above, or a non-flat-panel display, such as a CRT or other tube device, as is well known to those of skill in the art. However, for purposes of describing the present embodiment, the display 30 includes an interferometric modulator display, as described herein.

The components of one embodiment of exemplary display device 40 are schematically illustrated in FIG. 6B. The illustrated exemplary display device 40 includes a housing 41 and can include additional components at least partially enclosed therein. For example, in one embodiment, the exemplary display device 40 includes a network interface 27 that includes an antenna 43, which is coupled to a transceiver 47. The transceiver 47 is connected to a processor 21, which is connected to conditioning hardware 52. The conditioning hardware 52 may be configured to condition a signal (e.g., filter a signal). The conditioning hardware 52 is connected to a speaker 45 and a microphone 46. The processor 21 is also connected to an input device 48 and a driver controller 29. The driver controller 29 is coupled to a frame buffer 28 and to an array driver 22, which in turn is coupled to a display array 30. A power supply 50 provides power to all components as required by the particular exemplary display device 40 design.

The network interface 27 includes the antenna 43 and the transceiver 47 so that the exemplary display device 40 can communicate with one or more devices over a network. In one embodiment, the network interface 27 may also have some processing capabilities to relieve requirements of the processor 21. The antenna 43 is any antenna known to those of skill in the art for transmitting and receiving signals. In one embodiment, the antenna transmits and receives RF signals according to the IEEE 802.11 standard, including IEEE 802.11(a), (b), or (g). In another embodiment, the antenna transmits and receives RF signals according to the BLUETOOTH standard. In the case of a cellular telephone, the antenna is designed to receive CDMA, GSM, AMPS, or other known signals that are used to communicate within a wireless cell phone network. The transceiver 47 pre-processes the signals received from the antenna 43 so that they may be received by and further manipulated by the processor 21. The transceiver 47 also processes signals received from the processor 21 so that they may be transmitted from the exemplary display device 40 via the antenna 43.

In an alternative embodiment, the transceiver 47 can be replaced by a receiver. In yet another alternative embodiment, network interface 27 can be replaced by an image source, which can store or generate image data to be sent to the processor 21. For example, the image source can be a digital video disc (DVD) or a hard-disc drive that contains image data, or a software module that generates image data.

Processor 21 generally controls the overall operation of the exemplary display device 40. The processor 21 receives data, such as compressed image data from the network interface 27 or an image source, and processes the data into raw image data or into a format that is readily processed into raw image data. The processor 21 then sends the processed data to the driver controller 29 or to frame buffer 28 for storage. Raw data typically refers to the information that identifies the image characteristics at each location within an image. For example, such image characteristics can include color, saturation, and gray-scale level.

In one embodiment, the processor 21 includes a microcontroller, CPU, or logic unit to control operation of the exemplary display device 40. Conditioning hardware 52 generally includes amplifiers and filters for transmitting signals to the speaker 45, and for receiving signals from the microphone 46. Conditioning hardware 52 may be discrete components within the exemplary display device 40, or may be incorporated within the processor 21 or other components.

The driver controller 29 takes the raw image data generated by the processor 21 either directly from the processor 21 or from the frame buffer 28 and reformats the raw image data appropriately for high speed transmission to the array driver 22. Specifically, the driver controller 29 reformats the raw image data into a data flow having a raster-like format, such that it has a time order suitable for scanning across the display array 30. Then the driver controller 29 sends the formatted information to the array driver 22. Although a driver controller 29, such as a LCD controller, is often associated with the system processor 21 as a stand-alone Integrated Circuit (IC), such controllers may be implemented in many ways. They may be embedded in the processor 21 as hardware, embedded in the processor 21 as software, or fully integrated in hardware with the array driver 22.

Typically, the array driver 22 receives the formatted information from the driver controller 29 and reformats the video data into a parallel set of waveforms that are applied many times per second to the hundreds and sometimes thousands of leads coming from the display's x-y matrix of pixels.

In one embodiment, the driver controller 29, array driver 22, and display array 30 are appropriate for any of the types of displays described herein. For example, in one embodiment, driver controller 29 is a conventional display controller or a bi-stable display controller (e.g., an interferometric modulator controller). In another embodiment, array driver 22 is a conventional driver or a bi-stable display driver (e.g., an interferometric modulator display). In one embodiment, a driver controller 29 is integrated with the array driver 22. Such an embodiment is common in highly integrated systems such as cellular phones, watches, and other small area displays. In yet another embodiment, display array 30 is a typical display array or a bi-stable display array (e.g., a display including an array of interferometric modulators).

The input device 48 allows a user to control the operation of the exemplary display device 40. In one embodiment, input device 48 includes a keypad, such as a QWERTY keyboard or a telephone keypad, a button, a switch, a touch-sensitive screen, or a pressure- or heat-sensitive membrane. In one embodiment, the microphone 46 is an input device for the exemplary display device 40. When the microphone 46 is used to input data to the device, voice commands may be provided by a user for controlling operations of the exemplary display device 40.

Power supply 50 can include a variety of energy storage devices as are well known in the art. For example, in one embodiment, power supply 50 is a rechargeable battery, such as a nickel-cadmium battery or a lithium ion battery. In another embodiment, power supply 50 is a renewable energy source, a capacitor, or a solar cell including a plastic solar cell, and solar-cell paint. In another embodiment, power supply 50 is configured to receive power from a wall outlet.

In some embodiments, control programmability resides, as described above, in a driver controller which can be located in several places in the electronic display system. In some embodiments, control programmability resides in the array driver 22. Those of skill in the art will recognize that the above-described optimizations may be implemented in any number of hardware and/or software components and in various configurations.

Figure 7A:
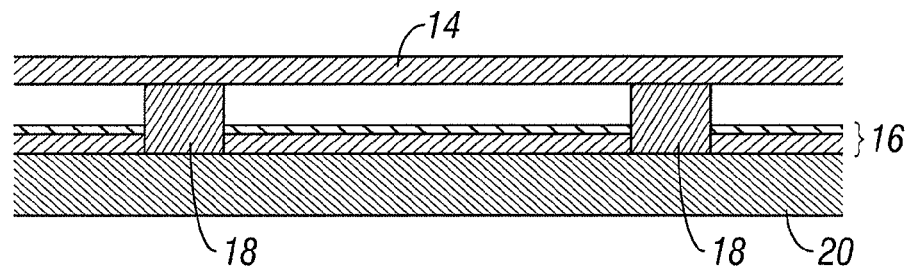
FIG. 7A is a cross section of the device of FIG. 1.
Figure 7B:
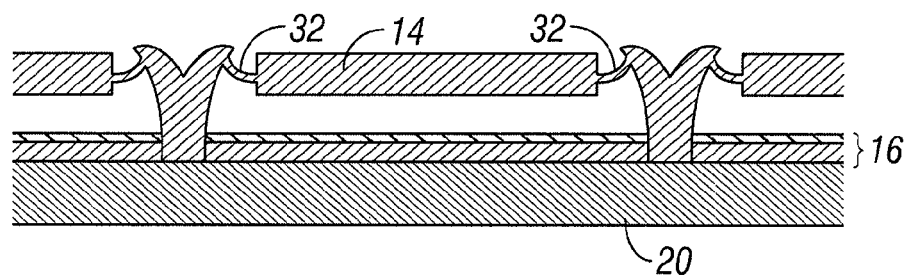
FIG. 7B is a cross section of an alternative embodiment of an interferometric modulator.
Figure 7C:
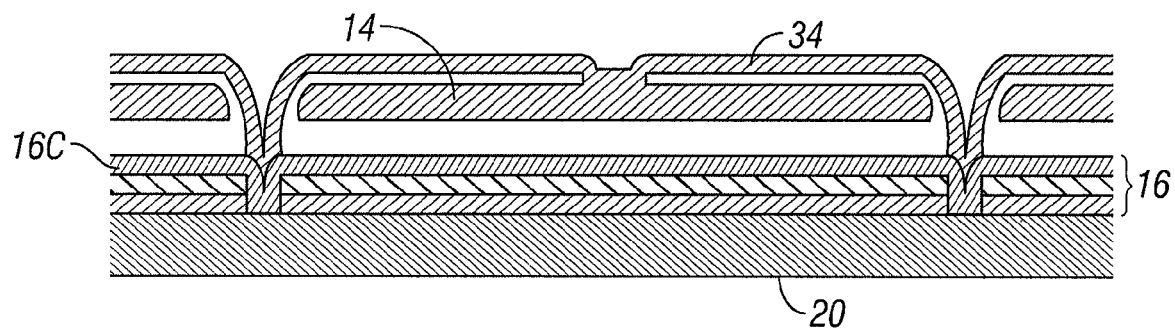
FIG. 7C is a cross section of another alternative embodiment of an interferometric modulator.
Figure 7D:
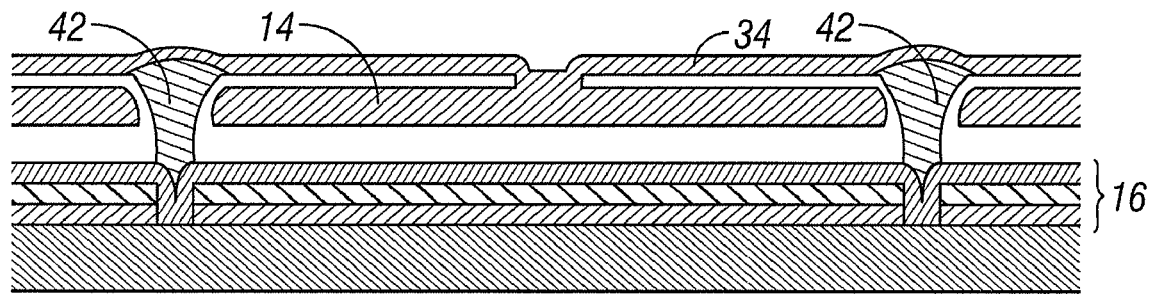
FIG. 7D is a cross section of yet another alternative embodiment of an interferometric modulator.
Figure 7E:
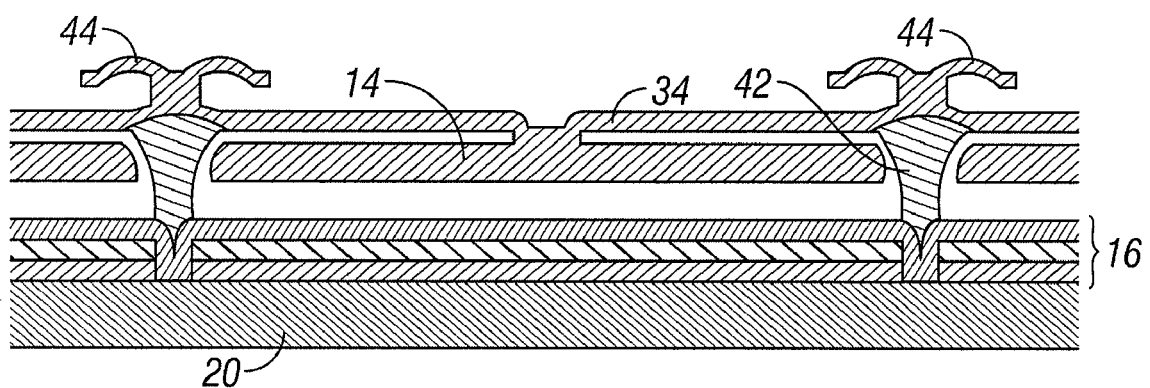
FIG. 7E is a cross section of an additional alternative embodiment of an interferometric modulator.

The details of the structure of interferometric modulators that operate in accordance with the principles set forth above may vary widely. For example, FIGS. 7A-7E illustrate five different embodiments of the movable reflective layer 14 and its supporting structures. FIG. 7A is a cross section of the embodiment of FIG. 1, where a strip of metal material 14 is deposited on orthogonally extending supports 18. In FIG. 7B, the moveable reflective layer 14 is attached to supports at the corners only, on tethers 32. In FIG. 7C, the moveable reflective layer 14 is suspended from a deformable layer 34, which may comprise a flexible metal. The deformable layer 34 connects, directly or indirectly, to the substrate 20 around the perimeter of the deformable layer 34. These connections are herein referred to as support posts. The embodiment illustrated in FIG. 7D has support post plugs 42 upon which the deformable layer 34 rests. The movable reflective layer 14 remains suspended over the gap, as in FIGS. 7A-7C, but the deformable layer 34 does not form the support posts by filling holes between the deformable layer 34 and the optical stack 16. Rather, the support posts are formed of a planarization material, which is used to form support post plugs 42. The embodiment illustrated in FIG. 7E is based on the embodiment shown in FIG. 7D, but may also be adapted to work with any of the embodiments illustrated in FIGS. 7A-7C, as well as additional embodiments not shown. In the embodiment shown in FIG. 7E, an extra layer of metal or other conductive material has been used to form a bus structure 44. This allows signal routing along the back of the interferometric modulators, eliminating a number of electrodes that may otherwise have had to be formed on the substrate 20.

In embodiments such as those shown in FIG. 7, the interferometric modulators function as direct-view devices, in which images are viewed from the front side of the transparent substrate 20, the side opposite to that upon which the modulator is arranged. In these embodiments, the reflective layer 14 optically shields the portions of the interferometric modulator on the side of the reflective layer opposite the substrate 20, including the deformable layer 34. This allows the shielded areas to be configured and operated upon without negatively affecting the image quality. Such shielding allows the bus structure 44 in FIG. 7E, which provides the ability to separate the optical properties of the modulator from the electromechanical properties of the modulator, such as addressing and the movements that result from that addressing. This separable modulator architecture allows the structural design and materials used for the electromechanical aspects and the optical aspects of the modulator to be selected and to function independently of each other. Moreover, the embodiments shown in FIGS. 7C-7E have additional benefits deriving from the decoupling of the optical properties of the reflective layer 14 from its mechanical properties, which are carried out by the deformable layer 34. This allows the structural design and materials used for the reflective layer 14 to be optimized with respect to the optical properties, and the structural design and materials used for the deformable layer 34 to be optimized with respect to desired mechanical properties.

Figure 8A:
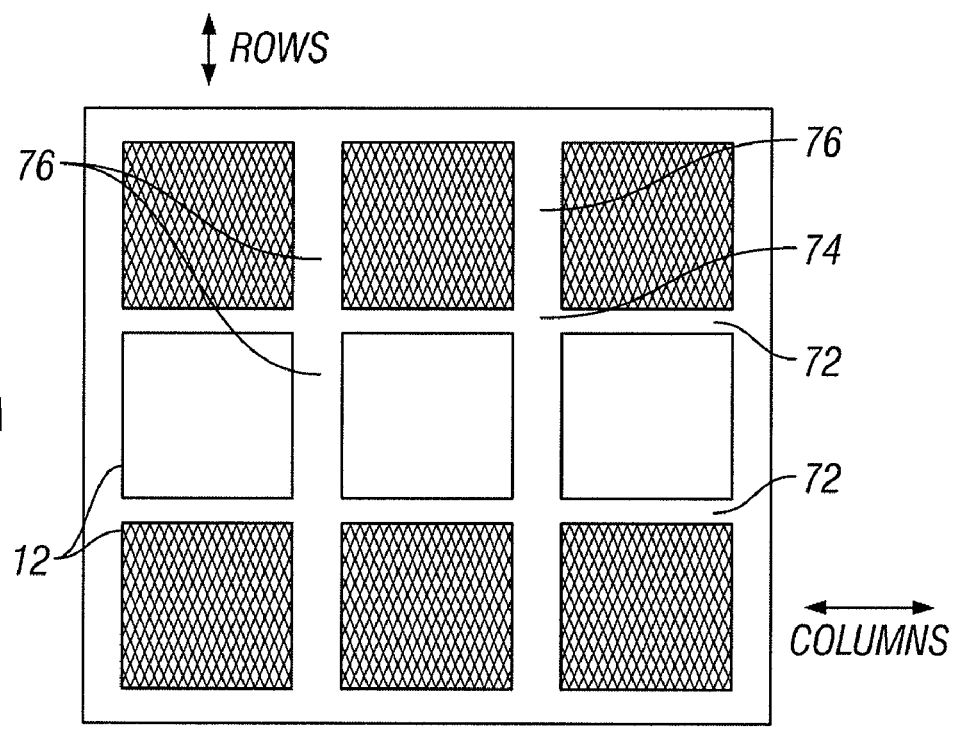
FIG. 8A is a top view of a portion of an interferometric modulator array illustrating non-active areas containing structures included in a plurality of pixels.
Figure 8B:
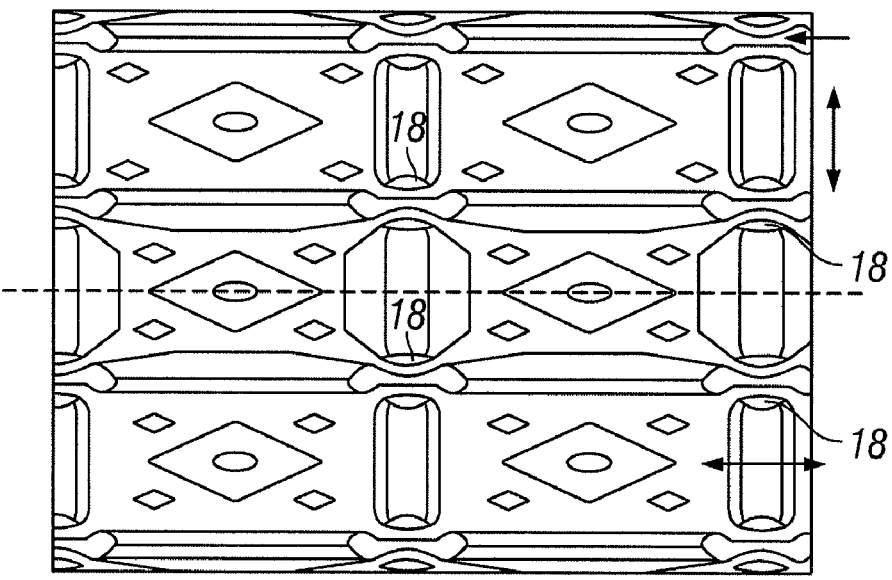
FIG. 8B is a top elevation view of a portion of an interferometric modulator array illustrating non-active areas containing structures included in a plurality of pixels.

FIGS. 8A and 8B illustrate an example of a portion of a display with display elements that can incorporate a black mask. FIGS. 8A and 8B illustrate an exemplary portion of a display that includes an array of interferometric modulators. A black mask can be used in the array shown in FIGS. 8A and 8B, and in any type of display where it is useful to mask off certain areas of the display from ambient light. FIG. 8A shows a plurality of pixels 12 of the array. FIG. 8B shows an example of supports 18 located on the plurality of pixels of the array of interferometric modulators that can be masked to improve the optical response of the display, from the back side of the substrate opposite the viewed "front" side of the display. To improve an optical response (e.g., contrast) of the display, it can be desirable to minimize light reflected from certain areas of the array. Any area of an interferometric modulator that increases the reflectance of the display in the dark state can be masked off (e.g., by disposing a mask between the structure and light entering the interferometric modulator) using a black mask in order to increase the contrast ratio. Some of the areas that can be masked to advantageously affect the display include, but are not limited to, row cuts between interferometric modulators 72 (FIG. 8A), the supports 18, bending areas of the movable mirror layers connecting to and/or around the supports 18 that are visible from the viewed side of the display, and areas between movable mirror layers of adjacent interferometric modulators 76 (FIG. 8A). The mask can be disposed in such areas so that it is spaced apart from the movable mirror of the interferometric modulators, e.g., so that ambient light can propagate to and reflect from the movable mirror, but the areas other than the movable mirror are masked, thus inhibiting ambient light from reflecting from any other structures in the masked areas. These areas that are masked can be referred to as "non-active areas" because they are static or not intended to provide light modulation, e.g., the areas do not include the movable mirror.

Figure 9:
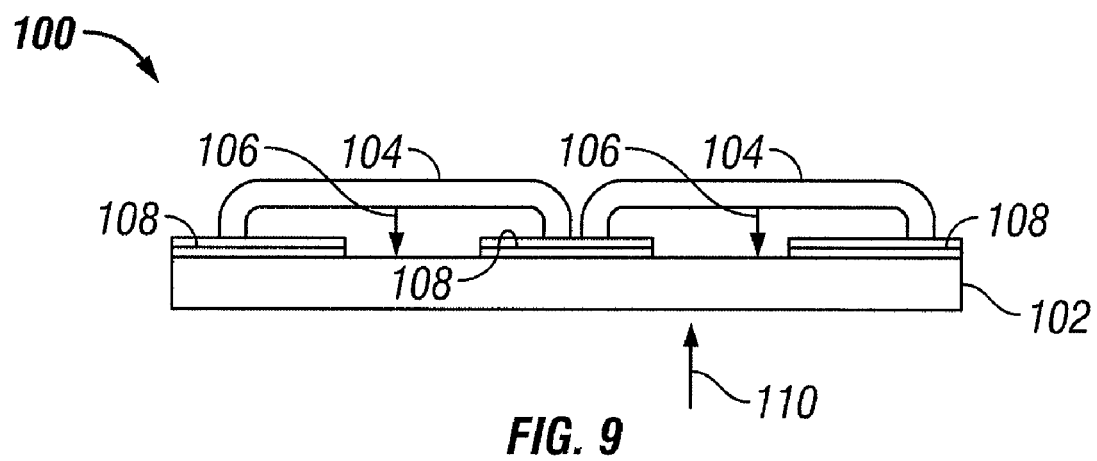
FIG. 9 shows a cross-section through a MEMS device having a mask or light-absorbing region.

FIG. 9 shows a cross-sectional view of a simplified representation of two elements of a multiple element display 100, according to one embodiment. The display comprises two optical components (other optical components not shown for clarity) which are, in this embodiment, interferometric modulators 104. As described above, interferometric modulator devices 104 comprise an arrangement of reflective and/or transmissive films that produce a desired optical response when the movable active area is driven towards a substrate 102 in a direction indicated by arrows 106. In FIG. 9, reference numerals 108 indicate non-active areas of the interferometric modulators 104. Typically, it is desirable that the non-active areas 108 be light-absorbing or to function as a black mask so that when a viewer looks at the display 100 from a direction indicated by the viewing arrow 110, the optical response produced by the interferometric modulator devices 104 is not degraded by the reflection of ambient light from the non-active areas 108. In other embodiments, it can be desirable to mask the non-active areas 108 with a colored mask (for example, green, red, blue, yellow, etc.) other than black.

A mask for a non-active area 108 may be fabricated from materials selected to have an optical response to absorb or attenuate light. The materials used to fabricate the mask may be electrically conductive. According to embodiments herein, a mask for each non-active area 108 can be fabricated as a stack of thin films. For example, in one embodiment, the stack of thin films may comprise a reflector layer positioned over an absorber layer which is positioned over a non-light absorbing dielectric layer. In other embodiments, the non-active areas 108 may comprise a single layer of organic or inorganic materials which attenuates or absorbs light, and a layer of a conductive material such as chrome or aluminum.

Figure 10A:
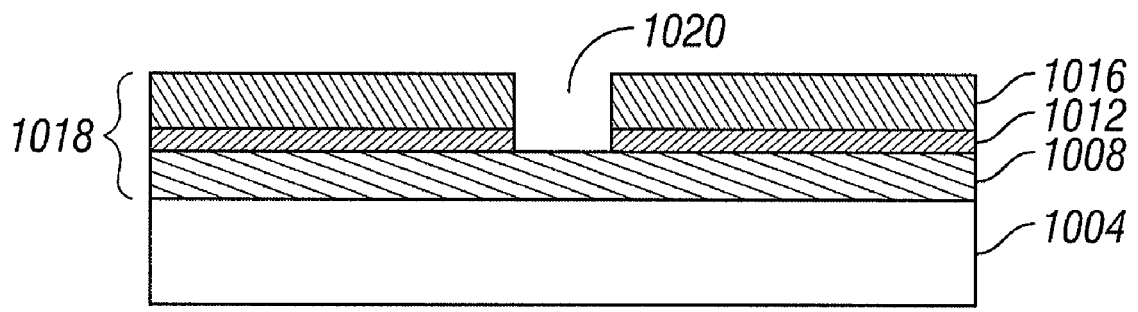
FIG. 10A illustrates a thin black mask.

FIG. 10A depicts a thin black mask 1018 according to an embodiment. A dielectric layer 1008 is positioned over a substrate 1004. A patterned layer comprises an absorber layer 1012 and a reflector layer 1016 is positioned over the dielectric layer 1008. The absorber layer 1012 and the reflector layer 1016 may be patterned to have a step size 1020 of less then six hundred angstroms. A thin black mask with a shallow patterning step makes the processes for the subsequent layers in the iMOD device easier.

In one embodiment, the thin black mask is patterned using a single mask process. Compared to a double mask process, this single mask process can avoid problems caused by overlay errors and provides savings in manufacturing costs and can reduce the complexity of creating the thin black mask.

In another embodiment, the layers of the black mask have an increasing ratio of the extinction coefficient (k) over the refractive index (n) between the substrate and the reflector layer (i.e., the ratio of k/n monotonically increases for each subsequent layer formed on the substrate). In alternative embodiments, the ratio of k/n gradually increases from dielectric to absorber to reflector. This increasing ratio provides the black mask with better light absorption capability. In various embodiments, the thin black mask reflects less then one percent of incoming light.

Figures 10B, 10C, 10D:
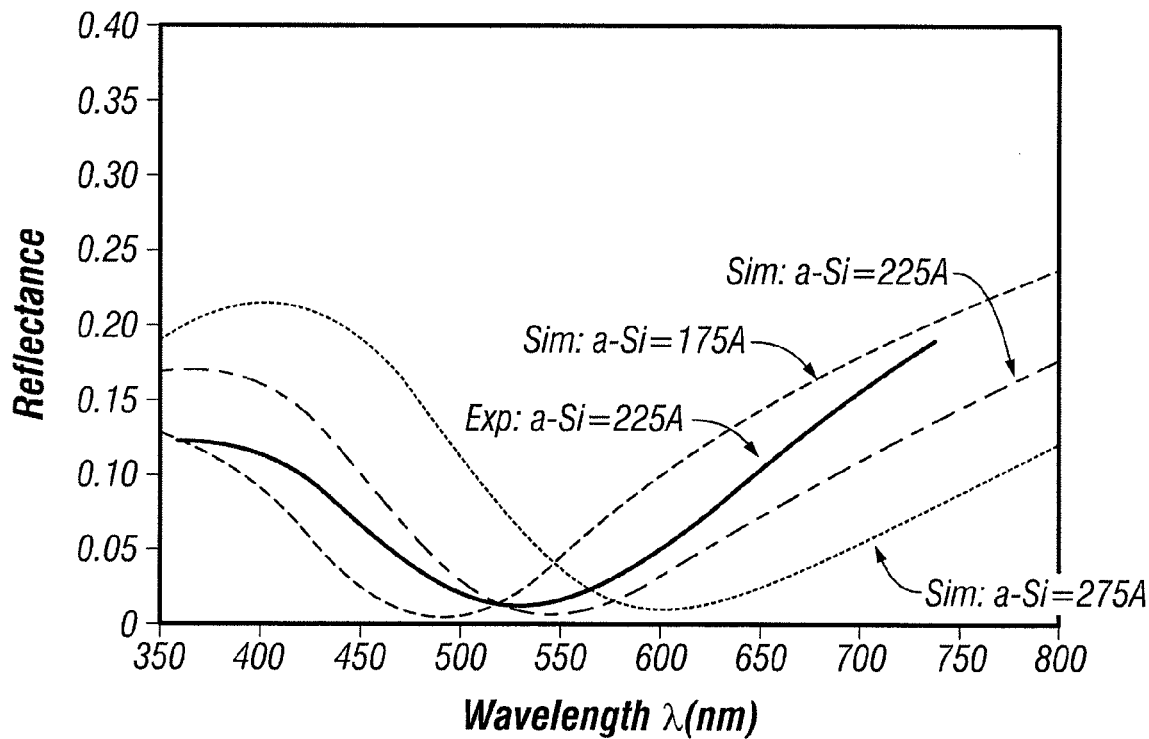
FIGS. 10B-10C are tables showing experimental data for a black mask prototype.
FIG. 10D is a chart showing the percentage of reflectance of light for the black mask prototype.

FIG. 10B is a table showing simulation data from a variety of black mask stacks. In the first column, the different layers are specified. In the second column, the material used in each layer is specified. And in the third column, the target thicknesses for each layer used in the simulation are specified. The table gives information for three different black masks, each black mask having an absorber layer of different thickness. The first black mask has a dielectric layer that is 200 angstroms thick, an absorber layer of amorphous silicon (a-Si) that is 175 angstroms thick, and a reflector layer that is 600 angstroms thick. The second black mask has a dielectric layer that is 200 angstroms thick, an absorber layer that is 225 angstroms thick, and a reflector layer that is 600 angstroms thick. The third black mask has a dielectric layer that is 200 angstroms thick, an absorber layer that is 275 angstroms thick, and a reflector layer that is 600 angstroms thick. The substrate layer and the media layer may be any thickness larger then 1 micron and are represented as having infinite thickness. Using FIG. 10A as an example, the substrate, dielectric layer, absorber layer and reflector layer correspond to layers 1004, 1008, 1012, 1016 respectively.

FIG. 10C is a table showing the percentage of reflectance of light for the black mask having and absorber thickness of 225 angstroms. As seen in the table, the percentage of incoming light that was reflected was approximately 1.9% during simulation. During experimental tests, the percentage of incoming light reflected was approximately 2.6%.

FIG. 10D is a graph showing the percentage of reflectance of different wavelengths of light for the three different black masks described in FIG. 10B. The three dotted lines show the simulation data for the three black masks. The solid line shows the experimental data for the black mask with an absorber layer that is 225 angstroms thick. The x-axis shows the different wavelengths of incoming light. The y-axis shows the percentage of light reflected. The y-axis is shown on a scale of 1, meaning that at 0.05 on the y-axis, 5% of incoming light is reflected. As is shown in the graph, the experimental black mask with an absorber layer that is 225 angstroms thick reflects approximately 2.6% of incoming light. The percentage of incoming light reflected is calculated using a photopically weighted average. Further analysis and testing showed that the reflector layer could be reduced by at least two hundred angstroms without degrading the performance of the black mask.

Figures 10E, 10F, 10G:
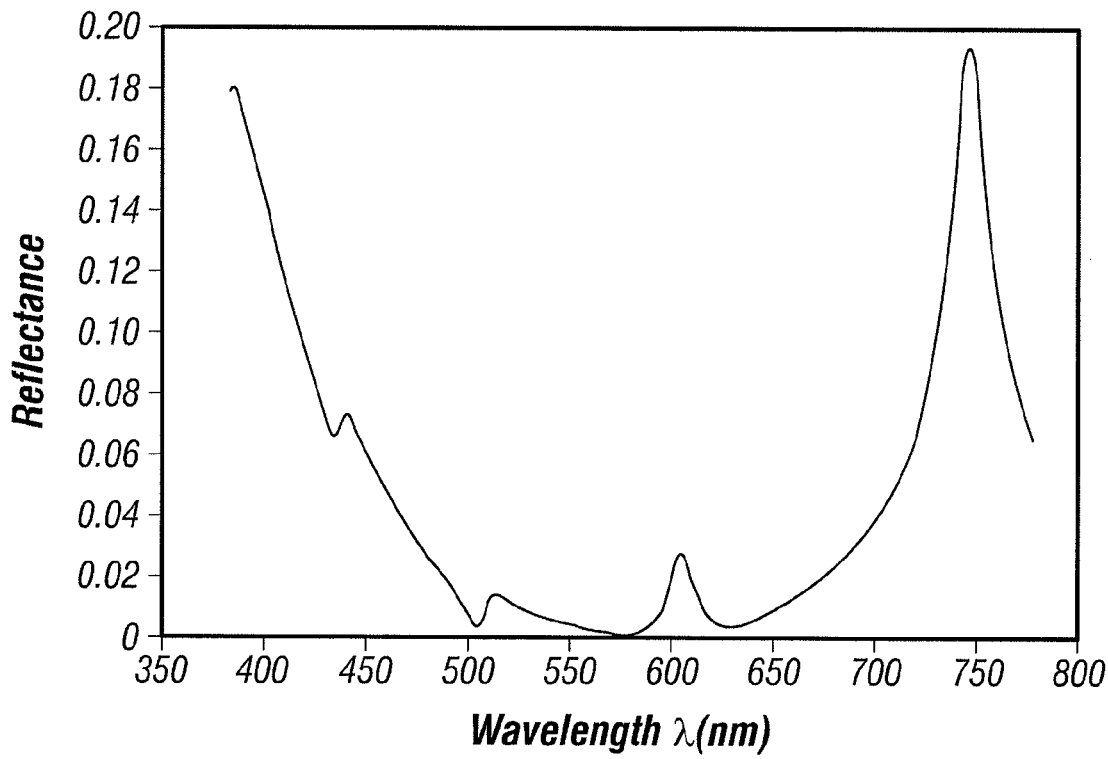
FIGS. 10E-10F are tables showing experimental data for a thin black mask.
FIG. 10G is a chart showing the percentage of reflectance of light for a thin black mask.

FIG. 10E is a table showing the layers, materials and thicknesses of the layers for a thin black mask according to an alternative embodiment. The high index dielectric layer comprises SiNx and is 600 angstroms thick. The absorber layer comprises a-Si and is 140 angstroms thick. The reflector layer comprises two layers and is a total of 400 angstroms thick. The first layer in the reflector layer comprises Mo and it is 300 angstroms thick, and the second layer in the reflector layer comprises Al and it is 100 angstroms thick. Using FIG. 10A as an example, the substrate, dielectric layer, absorber layer and reflector layer correspond to layers 1004, 1008, 1012, 1016 respectively.

FIG. 10F is a table showing the simulation results for the percentage of incoming light reflected by the thin black mask stack of FIG. 10E. As show in the table, a thin black mask according to the embodiment discussed in FIG. 10E reflects approximately 0.7% of incoming light.

FIG. 10G is a graph showing the percentage of reflectance of different wavelengths of light for the embodiment of the thin black mask discussed in FIG. 10E. The x-axis shows the different wavelengths of incoming light. The y-axis shows the percentage of light reflected. The y-axis is shown on a scale of 1, meaning that at 0.02 on the y-axis, 2% of incoming light is reflected. As seen in the graph, the thin black mask reflects approximately 0.7% of incoming light. The percentage of incoming light that is reflected is calculated using a photopically weighted average.

In certain embodiments, a buffer layer may be deposited over the thin black mask. The buffer layer may provide electrical isolation for other layers or structures that may be constructed over the thin black mask. The buffer layer may also serve as a planarization layer for other layers or structures that may be constructed over the thin black mask. A planarization layer may create a flatter surface which would minimize the effect of the step size on the layers or structures constructed over the thin black mask. The buffer layer may be transparent and may comprise dielectric material including but not limited to SiO2.

Figure 10H:
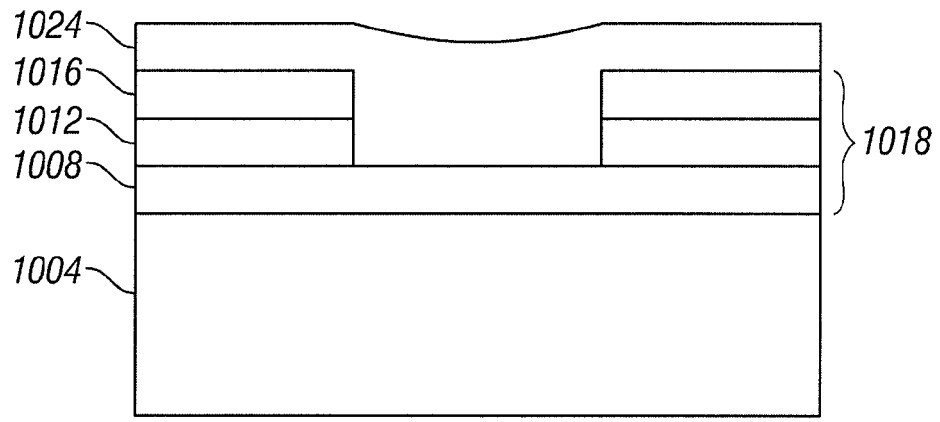
FIG. 10H illustrates a thin black mask according to another embodiment.

FIG. 10H depicts a thin black mask 1018 according to another embodiment. A dielectric layer 1008 is positioned over a substrate 1004. A patterned layer comprises an absorber layer 1012 and a reflector layer 1016 is positioned over the dielectric layer 1008. The absorber layer 1012 and the reflector layer 1016 may be patterned. A buffer layer 1024 is deposited over the thin black mask 1018.

Figure 10I:
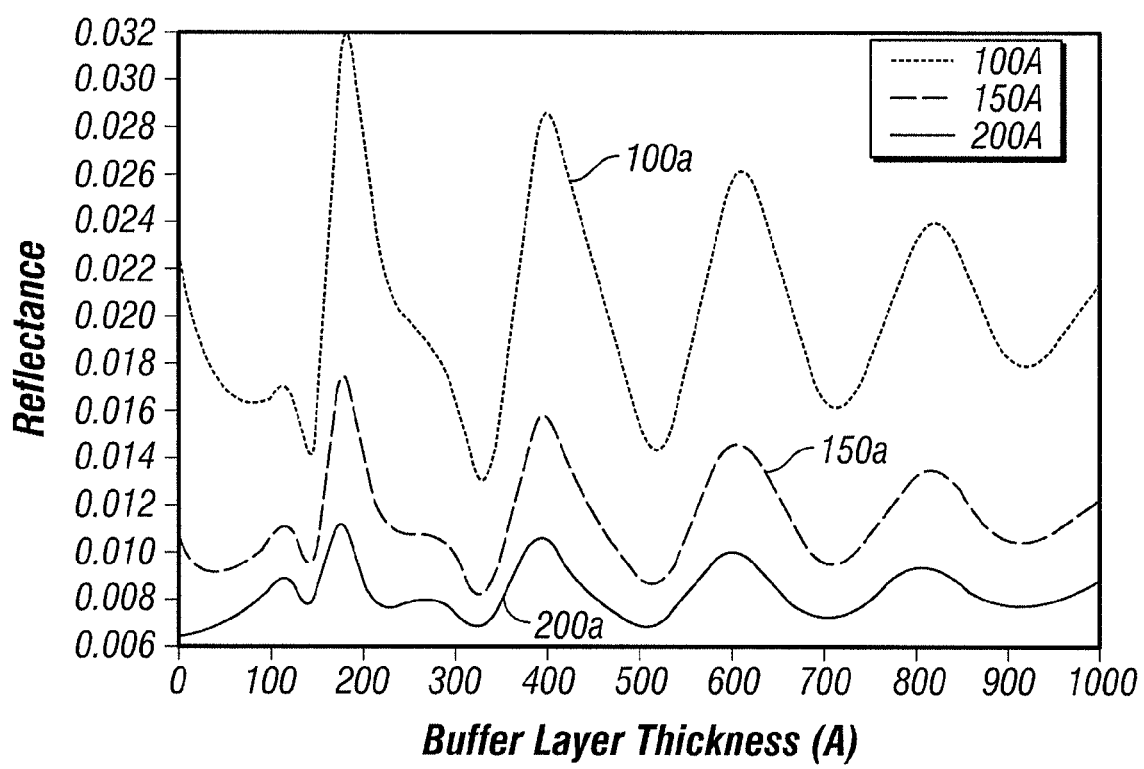
FIG. 10I is a graph showing the percentage of reflectance for a thin black mask, for different buffer thicknesses.

FIG. 10I is a graph that shows the percentage of light reflected using different buffer layer thicknesses for three different reflector layer thickness. The dotted line shows the percentage of incoming light that is reflected when the reflector layer is 100 angstroms thick. The dashed line shows the percentage of incoming light that is reflected when the reflector layer is 150 angstroms thick. And the solid line shows the percentage of incoming light that is reflected when the reflector layer is 200 angstroms thick. As shown in the graph, the percentage of incoming light reflected when the reflector layer is 200 angstroms thick is generally less then 1% regardless of thickness of the buffer layer.

FIGS. 11A to 11D illustrate a method of manufacturing a thin black mask according to an embodiment. Starting in FIG. 11A, a dielectric layer 1108 is deposited over a substrate 1104. The substrate 1104 may comprise glass, plastic, or any other material suitable for use as a substrate. The dielectric layer 1108 may comprise SiO2, SiNx, MgF2, ITO, Al2O3, Yi2O3, ZnO, or any other material suitable for use as a dielectric. The dielectric layer 1108 may comprise multiple layers of different material.

Figure 11A:
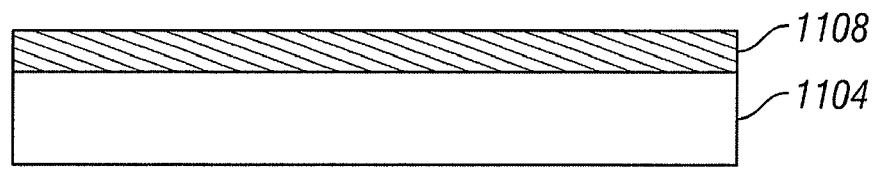
FIGS. 11A to 11D illustrate a method of fabricating a thin black mask.
Figure 11B:
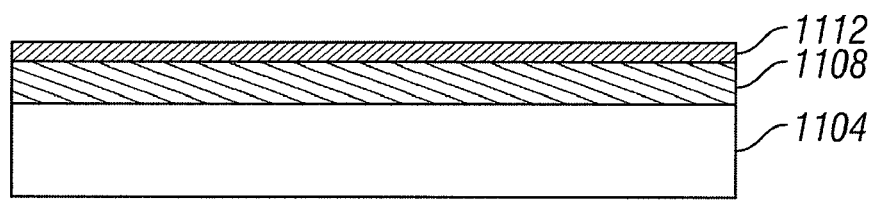

Next in FIG. 11B, an absorber layer 1112 is deposited over the dielectric layer 1108. The absorber layer 1112 may comprise a-Si, a-Ge, silicon alloys, germanium alloys, or any other material suitable for use as an absorber. The absorber layer 1112 may comprise multiple layers of different material.

Figure 11C:
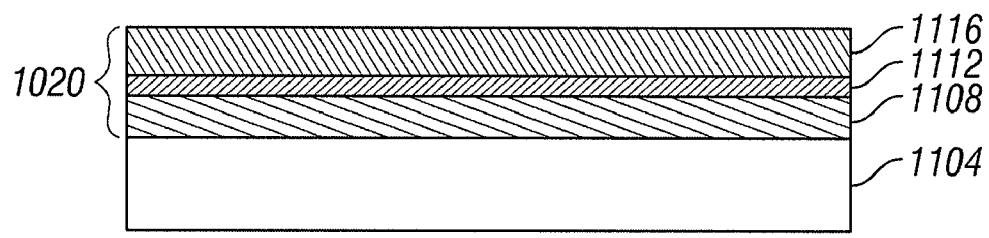

Then in FIG. 11C, a reflector layer 1116 is deposited over the absorber layer 1112. The reflector layer 1116 may comprise Mo, Cr, Ni, Al, Ag, or any other material suitable for use as a reflector. The reflector layer 1116 may comprise multiple layers of different material. The specification does not in any way limit the types of materials that may be used in the substrate layer, the absorber layer or the reflector layer. The materials listed are examples of materials that may be used, but to not limit the invention to only those materials.

Figure 11D:
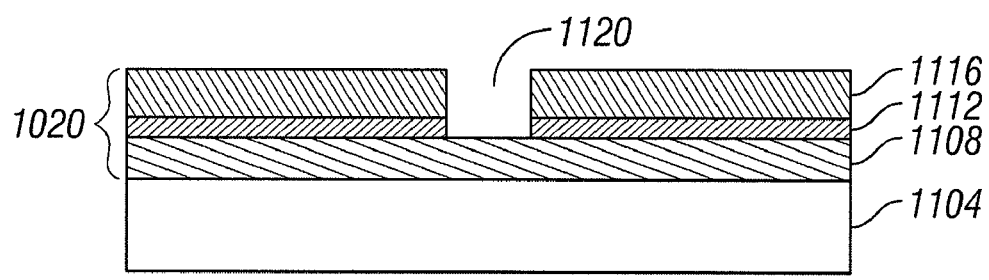

Moving to FIG. 11D, the reflector layer 1116 and the absorber layer 1112 are patterned using a single mask process, The single mask process patterns both the reflector layer 1116 and the absorber layer 1112. This reduces manufacturing costs as only one mask process is needed as compared to conventional black mask processes described below, while still creating a small step size of 600 angstroms or less.

In a first conventional black mask process, two mask steps are typically used, where a first mask step is used for the absorber layer and a second mask is used for the reflector layer, and the middle dielectric layer left unetched. The first conventional black mask process can reduce step height of the black mask to about 500 A, but uses two mask steps which may result in overlay errors. In a second conventional black mask process, an absorber/dielectric/reflector stack is used as the black mask, and a thick passivation layer is needed for subsequent processing. Generally this second conventional black mask process can be etched in a single mask step, but the thickness of the passivation layer depends on the thickness of the step height of the black mask, and typically the step height shown on the passivation layer exceeds 1000 A in total step height thereby creating a larger, undesired topography.

In contrast to the conventional black mask processes, the process described with respect to FIGS. 11A-D can provide a black mask that can be etched with a single mask step and with step height of 600 A or less.

Figure 12A:
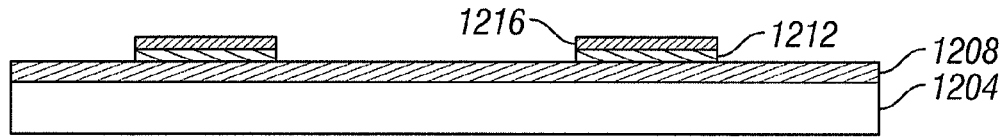
FIGS. 12A to 12E illustrate a method of fabricating a MEMS device using a thin black mask.
Figure 12B:
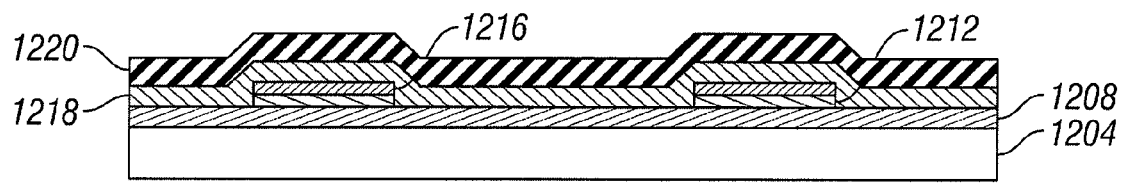
Figure 12C:
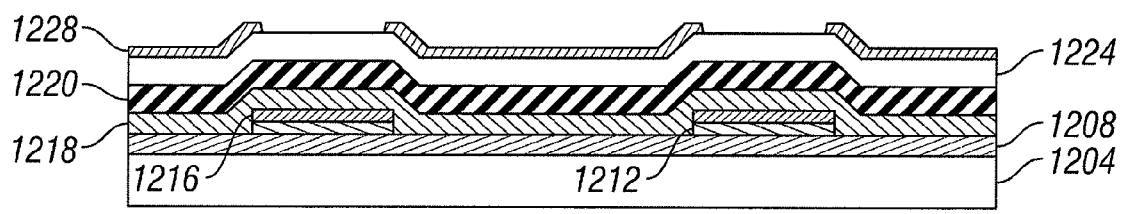
Figure 12D:
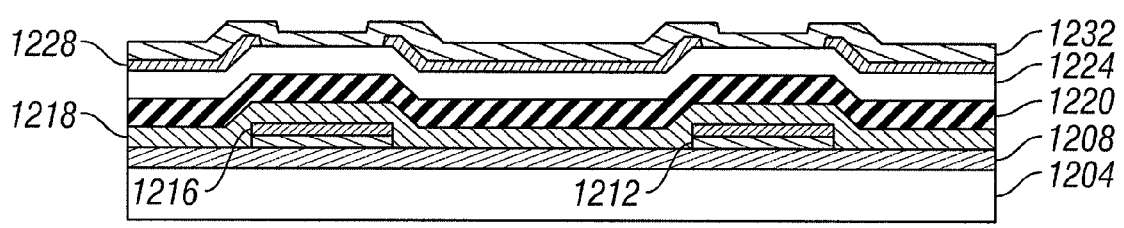
Figure 12E:
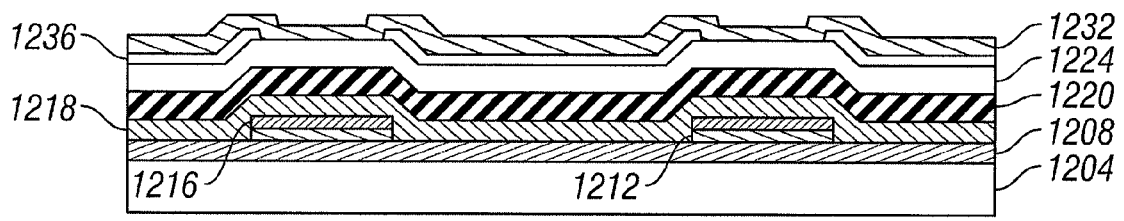

FIGS. 12A to 12E illustrates an example of a method of manufacturing a MEMS device using a thin black mask according to an embodiment. Starting in FIG. 12A, a dielectric layer 1208 is deposited over a substrate 1204. An absorber layer 1212 and a reflector layer 1216 are deposited and patterned according to the embodiment described in FIGS. 11A to 11D. This creates the patterned thin black mask. Then in FIG. 12B, a dielectric layer 1218 is deposited over the thin black mask and the dielectric layer 1208. A MEMS absorber layer 1220 is deposited over dielectric layer 1218. Next in FIG. 12C, a dielectric layer 1224 is deposited over the MEMS absorber layer 1220 and a sacrificial layer 1228 is deposited over the dielectric layer 1224. The sacrificial layer 1228 is then patterned. In FIG. 12D, the MEMS reflector layer is deposited over the sacrificial layer 1228 and the dielectric layer 1224. In FIG. 12E, the sacrificial layer 1228 is etched away leaving the final MEMS device. Note that because the black mask process described above is used, the total step height of 600 A or less for the black mask allows greater planarity for the MEMS absorber layer 1220 and subsequent layers, providing benefits in layer-to-layer processing. Further, the process to produce the final MEMS device requires fewer processing steps since only a single mask step is needed for the black mask elements.

The embodiments described above provide the functionality of a black mask while providing additional benefits. A thin black mask according to embodiments described herein allows devices which use the black mask to be thinner while reflecting less then one percent of incoming light. In another embodiment, the thin black mask is created using a single mask process resulting in lower manufacturing costs and decreasing the complexity of the manufacturing process. While various embodiments described herein pertain to MEMS or reflective displays, it will be understood that the invention is not limited to use in such devices.

Various modifications to these examples may be readily apparent to those skilled in the art, and the generic principles defined herein may be applied to other examples without departing from the spirit or scope of the novel aspects described herein. Thus, the scope of the disclosure is not intended to be limited to the examples shown herein but is to be accorded the widest scope consistent with the principles and novel features disclosed herein. Accordingly, the novel aspects described herein are to be defined solely by the following claims.

What is claimed is:

1. A device comprising:
   a black mask comprising a first, second, and a third layer in succession;
   the first layer with a first extinction coefficient to refractive index ratio;
   the second layer with a second extinction coefficient to refractive index ratio;
   the third layer with a third extinction coefficient to refractive index ratio;
   wherein the first extinction coefficient to refractive index ratio is less than the second extinction coefficient to refractive index ratio and the second extinction coefficient to refractive index ratio is less than the third extinction coefficient to refractive index ratio, and wherein the first layer contacts the second layer, and the second layer contacts the third layer.

2. The device of claim 1, wherein the black mask comprises a stack of interference films.

3. The electronic device of claim 1, wherein the stacked layers comprise:
a dielectric layer deposited over a substrate,
an absorber layer deposited over the dielectric layer, and
a reflector layer deposited over the absorber layer.

4. The device of claim 3, wherein the dielectric layer has an extinction coefficient in a range from 0 to 0.1 and a refractive index in a range of 1 to 3.

5. The device of claim 3, wherein the absorber layer has an extinction coefficient in a range from 1 to 4 and a refractive index in a range of 1 to 5.

6. The device of claim 3, wherein the reflector layer has an extinction coefficient in a range from 1 to 5 and a refractive index in a range of 0.1 to 5.

7. The device of claim 3, wherein the dielectric layer comprises at least two layers of material.

8. The device of claim 3, wherein the absorber layer comprises at least two layers of material.

9. The device of claim 3, wherein the reflector layer comprises at least two layers of material.

* * * * *

UNITED STATES PATENT AND TRADEMARK OFFICE
CERTIFICATE OF CORRECTION

PATENT NO. : 7,969,638 B2
APPLICATION NO. : 12/101073
DATED : June 28, 2011
INVENTOR(S) : Gang Xu et al.

It is certified that error appears in the above-identified patent and that said Letters Patent is hereby corrected as shown below:

At Item 56, Page 4, Column 2, Line 3, under Other Publications, change "Liquivista" to --Liquavista--.

At Column 3, Line 35, change "then" to --than--.

At Column 11, Line 41, change "then" to --than--.

At Column 11, Line 57, change "then" to --than--.

At Column 12, Line 9, change "then" to --than--.

At Column 13, Line 24, change "then" to --than--.

At Column 14, Line 38, change "then" to --than--.

Signed and Sealed this
First Day of May, 2012

David J. Kappos
*Director of the United States Patent and Trademark Office*